US012657643B2

(12) United States Patent
Mohseni et al.

(10) Patent No.: US 12,657,643 B2
(45) Date of Patent: Jun. 16, 2026

(54) SYSTEMS AND METHODS FOR GENERATING INSTRUCTIONS FOR FUTURE NETWORK OPTIMIZATION USING LANGUAGE MODELS

(71) Applicant: DK Crown Holdings Inc., Boston, MA (US)

(72) Inventors: Robin Mohseni, Billericay (GB); Gengyuan Zhang, Boston, MA (US); Gregory Von Pless, Melrose, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/359,534

(22) Filed: Oct. 15, 2025

(65) Prior Publication Data

US 2026/0112239 A1 Apr. 23, 2026

Related U.S. Application Data

(60) Provisional application No. 63/741,671, filed on Jan. 3, 2025, provisional application No. 63/741,297, filed
(Continued)

(51) Int. Cl.
*G07F 17/32* (2006.01)
*G06F 16/23* (2019.01)
(Continued)

(52) U.S. Cl.
CPC ........ *G07F 17/323* (2013.01); *G06F 16/2379* (2019.01); *G06F 40/279* (2020.01);
(Continued)

(58) Field of Classification Search
CPC ...................................................... G07F 17/32
See application file for complete search history.

(56) References Cited

U.S. PATENT DOCUMENTS 9,558,620 B2 * 1/2017 Froy ...................... A63F 13/30
10,311,670 B2 6/2019 Brahmandam et al.
(Continued)

FOREIGN PATENT DOCUMENTS

CN 116310582 A 6/2023
WO WO-2023/064563 A1 4/2023
(Continued)

OTHER PUBLICATIONS

Cureton, et al., "Federated learning for intent classification." In 2023 IEEE 19th International Conference on Intelligent Computer Communication and Processing (ICCP), pp. 315-322. IEEE, 2023. (Year: 2023).
(Continued)

*Primary Examiner* — Omkar A Deodhar
(74) *Attorney, Agent, or Firm* — Foley & Lardner LLP

(57) ABSTRACT

Described herein are systems and methods for generating instructions for network optimization using language models. A system can maintain a plurality of wager opportunities corresponding to a plurality of live events. The system can receive, from a client device associated with a player profile, a prompt comprising a condition and a request for a wager recommendation, where the condition corresponds to at least one future event. Using a language model and the prompt, the system can generate output including a command to monitor the condition and a selected wager opportunity. The system can determine that the condition has been satisfied, and in response, update the player profile to include a wager generated according to the selected wager opportunity. The system can provide an indication to the client device that the condition was satisfied.

26 Claims, 8 Drawing Sheets

Related U.S. Application Data on Jan. 2, 2025, provisional application No. 63/719,406, filed on Nov. 12, 2024, provisional application No. 63/711,415, filed on Oct. 24, 2024, provisional application No. 63/708,528, filed on Oct. 17, 2024, provisional application No. 63/708,542, filed on Oct. 17, 2024, provisional application No. 63/708,504, filed on Oct. 17, 2024, provisional application No. 63/708,554, filed on Oct. 17, 2024, provisional application No. 63/708,492, filed on Oct. 17, 2024, provisional application No. 63/708,509, filed on Oct. 17, 2024.

(51) Int. Cl.

| | |
|---|---|
| *G06F 40/279* | (2020.01) |
| *G06F 40/40* | (2020.01) |
| *G06Q 50/34* | (2012.01) |
| *G06F 40/35* | (2020.01) |

(52) U.S. Cl.
CPC ............. *G06F 40/40* (2020.01); *G06Q 50/34* (2013.01); *G07F 17/3237* (2013.01); *G07F 17/3288* (2013.01); *G06F 40/35* (2020.01)

(56) References Cited

U.S. PATENT DOCUMENTS

| | | | |
|---|---|---|---|
| 10,825,303 B2 | 11/2020 | McDonald et al. | |
| 10,950,086 B2 | 3/2021 | Brahmandam et al. | |
| 11,094,171 B2 | 8/2021 | Huke et al. | |
| 11,704,000 B1 | 7/2023 | McIvor et al. | |
| 11,735,006 B2 | 8/2023 | Nelson et al. | |
| 11,756,379 B2 | 9/2023 | Huke et al. | |
| 11,763,637 B2 | 9/2023 | Huke et al. | |
| 11,776,362 B2 | 10/2023 | Nelson et al. | |
| 11,785,280 B1 | 10/2023 | Dakss et al. | |
| 12,008,862 B2 | 6/2024 | Inamdar et al. | |
| 12,067,039 B1 | 8/2024 | Campos et al. | |
| 12,067,849 B2 | 8/2024 | Storm et al. | |
| 12,079,449 B2 | 9/2024 | McIvor et al. | |
| 12,118,320 B2 | 10/2024 | Gelfenbeyn et al. | |
| 12,128,288 B1 | 10/2024 | Redman et al. | |
| 12,190,683 B2 | 1/2025 | Huke et al. | |
| 12,307,861 B1 | 5/2025 | Todisco et al. | |
| 12,322,246 B2 * | 6/2025 | Turner | G07F 17/3227 |
| 12,361,796 B2 | 7/2025 | Joao | |
| 12,444,266 B2 | 10/2025 | Joao | |
| 12,457,239 B1 | 10/2025 | Mantin et al. | |
| 12,477,036 B1 * | 11/2025 | Tenbuuren | G06V 30/19173 |
| 2002/0068633 A1 | 6/2002 | Schlaifer | |
| 2008/0311981 A1 | 12/2008 | Schugar et al. | |
| 2010/0121808 A1 | 5/2010 | Kuhn | |
| 2010/0328066 A1 | 12/2010 | Walker et al. | |
| 2012/0310926 A1 | 12/2012 | Gannu et al. | |
| 2013/0274007 A1 | 10/2013 | Hilbert et al. | |
| 2014/0024435 A1 | 1/2014 | Scott | |
| 2014/0289236 A1 | 9/2014 | Agarwal et al. | |
| 2015/0038236 A1 | 2/2015 | Robbins et al. | |
| 2015/0339884 A1 | 11/2015 | Chun | |
| 2016/0086441 A1 | 3/2016 | Cohen et al. | |
| 2016/0155350 A1 | 6/2016 | Dragicevic et al. | |
| 2016/0189483 A1 | 6/2016 | Ballman | |
| 2016/0196723 A1 | 7/2016 | Ballman | |
| 2018/0068661 A1 | 3/2018 | Printz | |
| 2018/0204417 A1 | 7/2018 | Triplett | |
| 2018/0225911 A1 | 8/2018 | Washington et al. | |
| 2019/0012876 A1 | 1/2019 | Brahmandam et al. | |
| 2019/0122482 A1 | 4/2019 | Amaitis et al. | |
| 2019/0318582 A1 | 10/2019 | Barak | |
| 2019/0325028 A1 | 10/2019 | Palanichamy et al. | |
| 2019/0361966 A1 | 11/2019 | Munro et al. | |
| 2019/0362601 A1 | 11/2019 | Kline et al. | |
| 2019/0392684 A1 | 12/2019 | McDonald et al. | |
| 2020/0027314 A1 | 1/2020 | Pilnock et al. | |
| 2020/0118040 A1 | 4/2020 | Dey et al. | |
| 2020/0234543 A1 | 7/2020 | Schwartz et al. | |
| 2021/0118264 A1 | 4/2021 | Nelson et al. | |
| 2021/0217277 A1 | 7/2021 | Huke et al. | |
| 2021/0217278 A1 * | 7/2021 | Huke | G07F 17/323 |
| 2021/0233344 A1 | 7/2021 | Amaitis et al. | |
| 2021/0248707 A1 | 8/2021 | Huke et al. | |
| 2021/0256650 A1 | 8/2021 | Huke et al. | |
| 2021/0272415 A1 | 9/2021 | Huke et al. | |
| 2021/0280006 A1 | 9/2021 | Pace | |
| 2021/0319666 A1 | 10/2021 | Salivar et al. | |
| 2021/0342550 A1 | 11/2021 | Palanichamy et al. | |
| 2021/0343122 A1 | 11/2021 | Warren | |
| 2021/0375090 A1 | 12/2021 | Huke et al. | |
| 2022/0019950 A1 | 1/2022 | Sabri | |
| 2022/0122601 A1 | 4/2022 | Cronin | |
| 2022/0139160 A1 | 5/2022 | Huke et al. | |
| 2022/0148364 A1 | 5/2022 | Huke et al. | |
| 2022/0157114 A1 | 5/2022 | Huke et al. | |
| 2022/0165118 A1 | 5/2022 | Huke et al. | |
| 2022/0165120 A1 | 5/2022 | Huke et al. | |
| 2022/0172560 A1 | 6/2022 | Huke et al. | |
| 2022/0188366 A1 | 6/2022 | Song et al. | |
| 2022/0270432 A1 | 8/2022 | Mendell et al. | |
| 2022/0351568 A1 | 11/2022 | Smith | |
| 2022/0358808 A1 | 11/2022 | Huke et al. | |
| 2022/0417603 A1 | 12/2022 | Pleiman | |
| 2023/0011114 A1 | 1/2023 | Guy et al. | |
| 2023/0082553 A1 | 3/2023 | Mendell | |
| 2023/0124722 A1 | 4/2023 | Polson et al. | |
| 2023/0162563 A1 | 5/2023 | Turner | |
| 2023/0185579 A1 | 6/2023 | Eranpurwala et al. | |
| 2023/0196871 A1 | 6/2023 | Inamdar et al. | |
| 2023/0252848 A1 * | 8/2023 | Isgar | G07F 17/3244 463/25 |
| 2023/0259714 A1 | 8/2023 | Lange | |
| 2023/0267805 A1 | 8/2023 | Edsall | |
| 2023/0350928 A1 | 11/2023 | Hill et al. | |
| 2023/0351845 A1 | 11/2023 | Mendell et al. | |
| 2023/0360488 A1 | 11/2023 | Alyekhin | |
| 2023/0360489 A1 | 11/2023 | Alyekhin | |
| 2023/0360494 A1 | 11/2023 | Alyekhin | |
| 2023/0394930 A1 | 12/2023 | Shore et al. | |
| 2023/0410591 A1 | 12/2023 | Monteverdi | |
| 2024/0029511 A1 | 1/2024 | Teruuchi | |
| 2024/0086648 A1 | 3/2024 | Han et al. | |
| 2024/0086773 A1 | 3/2024 | Oppenheimer | |
| 2024/0144777 A1 | 5/2024 | Mendell et al. | |
| 2024/0216820 A1 | 7/2024 | Leondires et al. | |
| 2024/0282296 A1 | 8/2024 | Bhathena et al. | |
| 2024/0312312 A1 | 9/2024 | Flint | |
| 2024/0320510 A1 | 9/2024 | Kundu et al. | |
| 2024/0346256 A1 | 10/2024 | Qin | |
| 2024/0350924 A1 | 10/2024 | Orlow | |
| 2024/0362409 A1 | 10/2024 | Kuan | |
| 2024/0362968 A1 | 10/2024 | Lyons et al. | |
| 2024/0362973 A1 | 10/2024 | Owoyemi | |
| 2024/0367054 A1 * | 11/2024 | Nelson | A63F 13/67 |
| 2024/0378251 A1 | 11/2024 | Boyd | |
| 2024/0378940 A1 | 11/2024 | Latifi et al. | |
| 2024/0403845 A1 | 12/2024 | O'Hanlon et al. | |
| 2024/0412058 A1 | 12/2024 | Mayande et al. | |
| 2024/0428700 A1 | 12/2024 | Asgekar et al. | |
| 2025/0046150 A1 * | 2/2025 | Huke | G07F 17/323 |
| 2025/0077913 A1 | 3/2025 | Vodeniktov et al. | |
| 2025/0086190 A1 | 3/2025 | Azarmi | |
| 2025/0094143 A1 | 3/2025 | Huang | |
| 2025/0094708 A1 | 3/2025 | Cunningham et al. | |
| 2025/0095438 A1 | 3/2025 | Russ et al. | |
| 2025/0103624 A1 | 3/2025 | Carta et al. | |
| 2025/0118151 A1 * | 4/2025 | Williams | G07F 17/3258 |
| 2025/0118156 A1 | 4/2025 | Jovanovic | |
| 2025/0124063 A1 | 4/2025 | Isslieb et al. | |
| 2025/0124340 A1 | 4/2025 | Ni et al. | |
| 2025/0140075 A1 | 5/2025 | Groset et al. | |
| 2025/0157284 A1 * | 5/2025 | Wolfe | G07F 17/3206 |
| 2025/0161811 A1 | 5/2025 | Assaad et al. | |
| 2025/0174083 A1 | 5/2025 | Huke et al. | |
| 2025/0191437 A1 | 6/2025 | Hanson et al. | |

(56) References Cited

U.S. PATENT DOCUMENTS

| | | | |
|---|---|---|---|
| 2025/0191440 A1* | 6/2025 | Bradley .............. | G07F 17/3237 |
| 2025/0209891 A1 | 6/2025 | Jacquet et al. | |
| 2025/0232126 A1 | 7/2025 | Ma et al. | |
| 2025/0238449 A1 | 7/2025 | Sharma et al. | |
| 2025/0265310 A1 | 8/2025 | Barnes | |
| 2025/0278633 A1 | 9/2025 | Smith et al. | |
| 2025/0291866 A1 | 9/2025 | Park et al. | |
| 2025/0294091 A1 | 9/2025 | Mukherjee et al. | |
| 2025/0299053 A1 | 9/2025 | Cuomo et al. | |
| 2025/0299536 A1 | 9/2025 | Chun et al. | |
| 2025/0307302 A1 | 10/2025 | Kolugur et al. | |
| 2025/0307572 A1 | 10/2025 | Shtar et al. | |
| 2025/0307639 A1 | 10/2025 | Jin et al. | |
| 2025/0316134 A1 | 10/2025 | Vaccaro | |
| 2025/0316139 A1 | 10/2025 | Vaccaro | |
| 2025/0316145 A1 | 10/2025 | Merati | |
| 2025/0322092 A1 | 10/2025 | Troiani et al. | |
| 2025/0322168 A1 | 10/2025 | Sharma | |
| 2025/0322295 A1 | 10/2025 | Brin et al. | |
| 2025/0329218 A1 | 10/2025 | Russ et al. | |
| 2025/0348580 A1 | 11/2025 | Galinkin | |
| 2025/0355929 A1 | 11/2025 | Lara Silva et al. | |
| 2025/0356725 A1 | 11/2025 | Nowak | |
| 2025/0363856 A1 | 11/2025 | Turner et al. | |
| 2026/0024524 A1 | 1/2026 | Perkins et al. | |

FOREIGN PATENT DOCUMENTS

| | | |
|---|---|---|
| WO | WO-2023/140642 A1 | 7/2023 |
| WO | WO-2024/194418 A1 | 9/2024 |

OTHER PUBLICATIONS

Final Office Action on U.S. Appl. No. 19/357,902 Dtd Feb. 9, 2026.
Final Office Action on U.S. Appl. No. 19/358,959 Dtd Feb. 5, 2026.
Final Office Action on U.S. Appl. No. 19/360,328 Dtd Feb. 26, 2026.
Final Office Action on U.S. Appl. No. 19/360,383 Dtd Feb. 3, 2026.
Lee, et al., "Sportify: Question Answering with Embedded Visualizations and Personified Narratives for Sports Video," in arXiv preprint arXiv:2408.05123 (2024). (Year: 2024).
Non-Final Office Action on U.S. Appl. No. 19/357,856 Dtd Jan. 2, 2026.
Non-Final Office Action on U.S. Appl. No. 19/357,889 Dtd Jan. 12, 2026.
Non-Final Office Action on U.S. Appl. No. 19/357,902 Dtd Dec. 16, 2025.
Non-Final Office Action on U.S. Appl. No. 19/357,918 Dtd Jan. 13, 2026.
Non-Final Office Action on U.S. Appl. No. 19/357,967 Dtd Jan. 28, 2026.
Non-Final Office Action on U.S. Appl. No. 19/358,916 Dtd Jan. 28, 2026.
Non-Final Office Action on U.S. Appl. No. 19/358,919 Dtd Dec. 23, 2025.
Non-Final Office Action on U.S. Appl. No. 19/358,959 Dtd Dec. 2, 2025.
Non-Final Office Action on U.S. Appl. No. 19/359,002 Dtd Jan. 13, 2026.

Non-Final Office Action on U.S. Appl. No. 19/359,036 Dtd Jan. 13, 2026.
Non-Final Office Action on U.S. Appl. No. 19/359,438 Dtd Dec. 19, 2025.
Non-Final Office Action on U.S. Appl. No. 19/359,531 Dtd Dec. 12, 2025.
Non-Final Office Action on U.S. Appl. No. 19/360,020 Dtd Jan. 14, 2026.
Non-Final Office Action on U.S. Appl. No. 19/360,307 Dtd Jan. 20, 2026.
Non-Final Office Action on U.S. Appl. No. 19/360,328 Dtd Dec. 11, 2025.
Non-Final Office Action on U.S. Appl. No. 19/360,368 Dtd Jan. 28, 2026.
Non-Final Office Action on U.S. Appl. No. 19/360,383 Dtd Dec. 15, 2025.
Non-Final Office Action on U.S. Appl. No. 19/360,405 Dtd Jan. 5, 2026.
Non-Final Office Action on U.S. Appl. No. 19/360,512 Dtd Dec. 30, 2025.
Non-Final Office Action on U.S. Appl. No. 19/360,597 Dtd Jan. 30, 2026.
Non-Final Office Action on U.S. Appl. No. 19/360,809 Dtd Jan. 14, 2026.
Non-Final Office Action on U.S. Appl. No. 19/360,880 Dtd Dec. 31, 2025.
Non-Final Office Action on U.S. Appl. No. 19/360,886 Dtd Feb. 19, 2026.
Non-Final Office Action on U.S. Appl. No. 19/360,886 Dtd Dec. 8, 2025.
Non-Final Office Action on U.S. Appl. No. 19/360,892 Dtd Jan. 13, 2026.
Notice of Allowance on U.S. Appl. No. 19/360,873 Dtd Jan. 26, 2026.
Schick et al., "Toolformer: Language Models Can Teach Themselves to Use Tools", Feb. 9, 2023, arXiv.com, pp. 1-17 (Year: 2023).
Structure Guided Prompt: Instructing Large Language Model in Multi-Step Reasoning by Exploring Graph Structure of the Text (Year: 2024).
Final Office Action on U.S. Appl. No. 19/357,856 Dtd Apr. 21, 2026.
Final Office Action on U.S. Appl. No. 19/357,889 Dtd Apr. 29, 2026.
Final Office Action on U.S. Appl. No. 19/358,919 Dtd Apr. 21, 2026.
Final Office Action on U.S. Appl. No. 19/359,438 Dtd Apr. 2, 2026.
Final Office Action on U.S. Appl. No. 19/359,531 Dtd Mar. 25, 2026.
Final Office Action on U.S. Appl. No. 19/360,512 Dtd Apr. 22, 2026.
Final Office Action on U.S. Appl. No. 19/360,809 Dtd May 1, 2026.
Final Office Action on U.S. Appl. No. 19/360,880 Dtd Apr. 29, 2026.
Non-Final Office Action on U.S. Appl. No. 19/360,030 Dtd May 7, 2026.
Notice of Allowance on U.S. Appl. No. 19/360,383 Dtd Apr. 17, 2026.
Notice of Allowance on U.S. Appl. No. 19/360,405 Dtd Apr. 24, 2026.

* cited by examiner

200

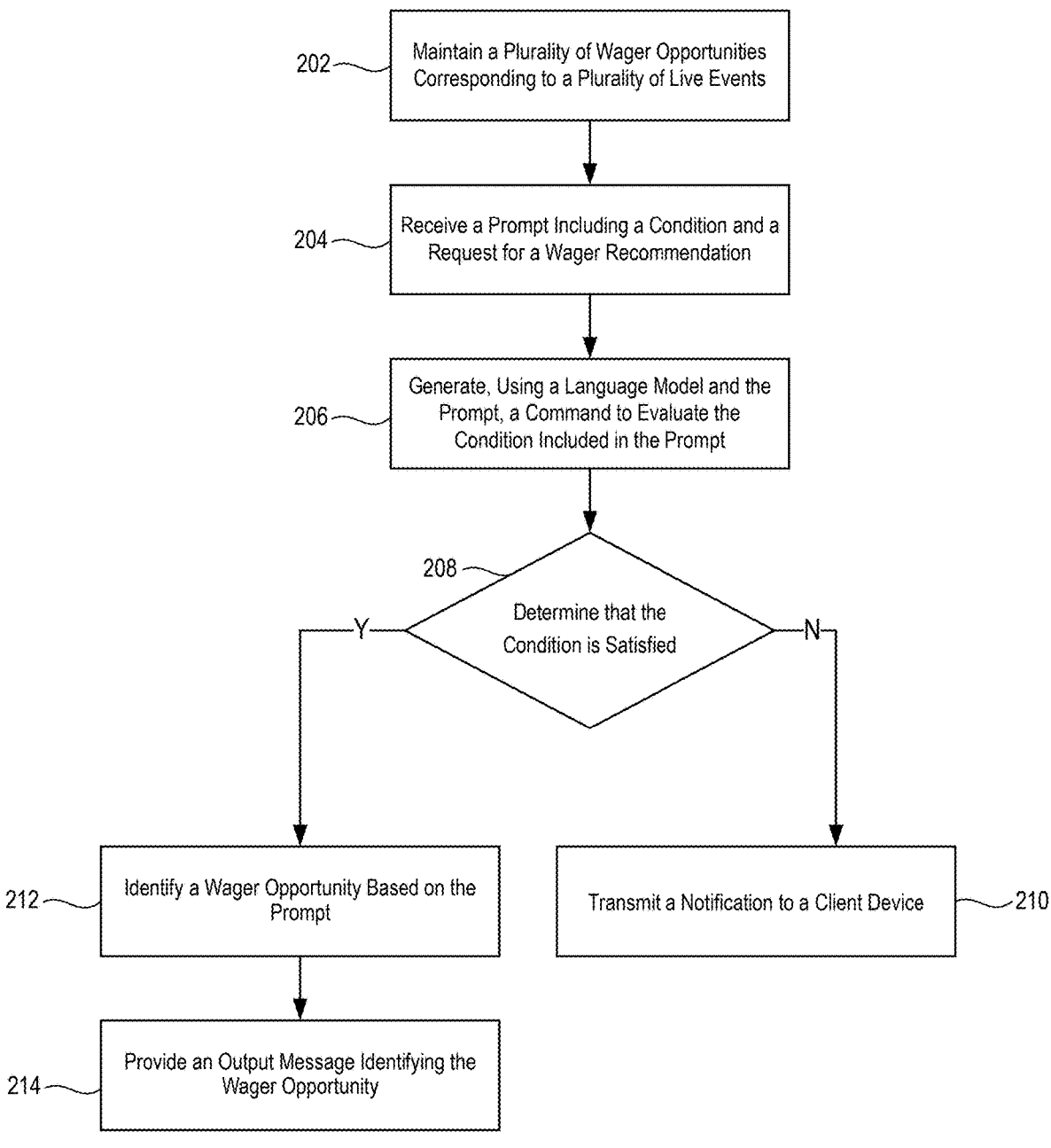

202 — Maintain a Plurality of Wager Opportunities Corresponding to a Plurality of Live Events 204 — Receive a Prompt Including a Condition and a Request for a Wager Recommendation 206 — Generate, Using a Language Model and the Prompt, a Command to Evaluate the Condition Included in the Prompt 208 — Determine that the Condition is Satisfied

Y

N

212 — Identify a Wager Opportunity Based on the Prompt

210 — Transmit a Notification to a Client Device

214 — Provide an Output Message Identifying the Wager Opportunity

302 — Place a wager on the Thunderbolts if they're playing tonight's game.

304 — The Thunderbolts are scheduled to play tonight. Here is your selection for tonight's game. A winning $10 bet would have a total payout of $28.

306 — ○ NY Thunderbolts · Moneyline

308 — +280

308 — 🔍 Send a message    🎤 — 310

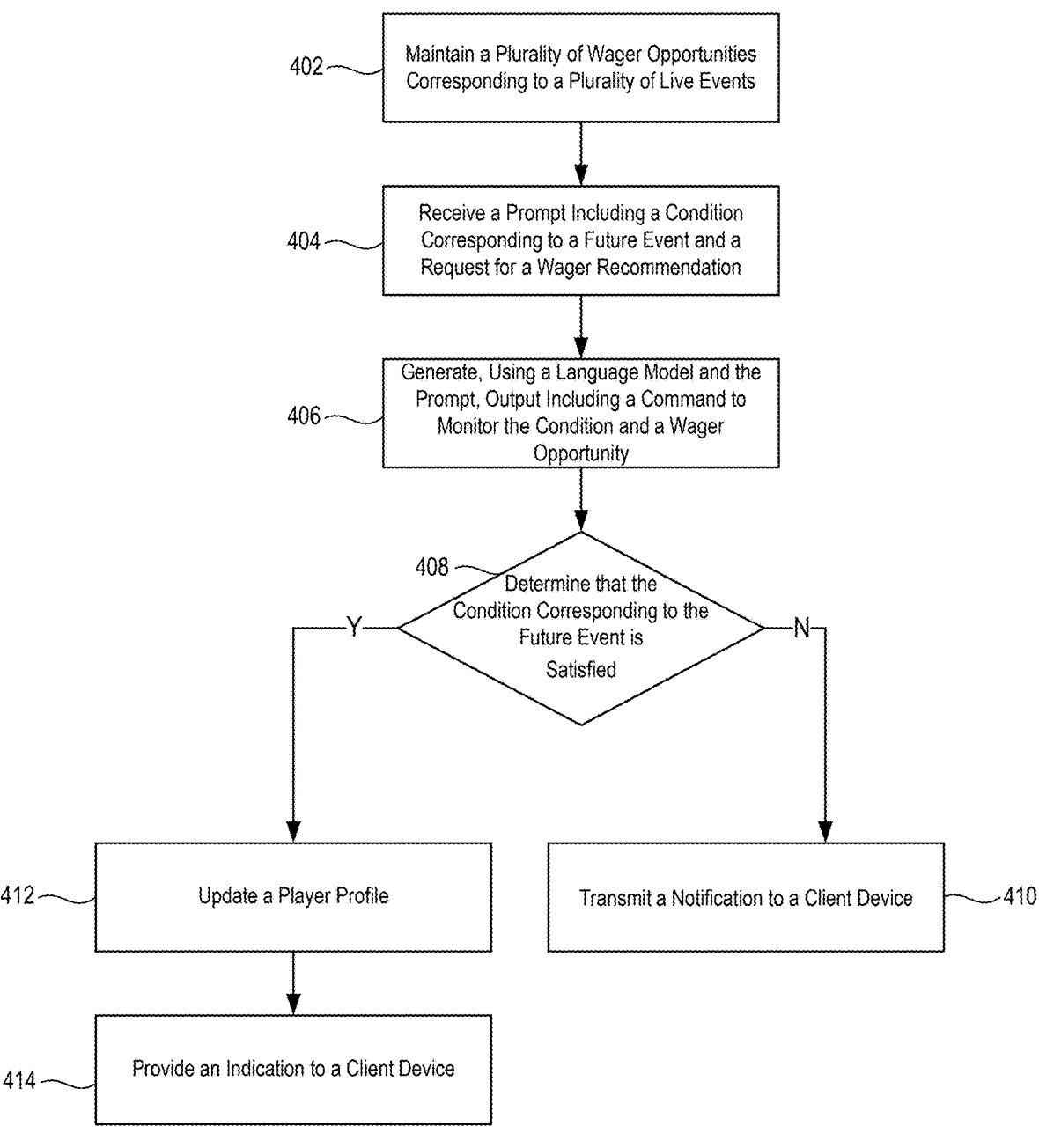

400

402 — Maintain a Plurality of Wager Opportunities Corresponding to a Plurality of Live Events 404 — Receive a Prompt Including a Condition Corresponding to a Future Event and a Request for a Wager Recommendation 406 — Generate, Using a Language Model and the Prompt, Output Including a Command to Monitor the Condition and a Wager Opportunity 408 — Determine that the Condition Corresponding to the Future Event is Satisfied

Y

N

412 — Update a Player Profile

410 — Transmit a Notification to a Client Device

414 — Provide an Indication to a Client Device

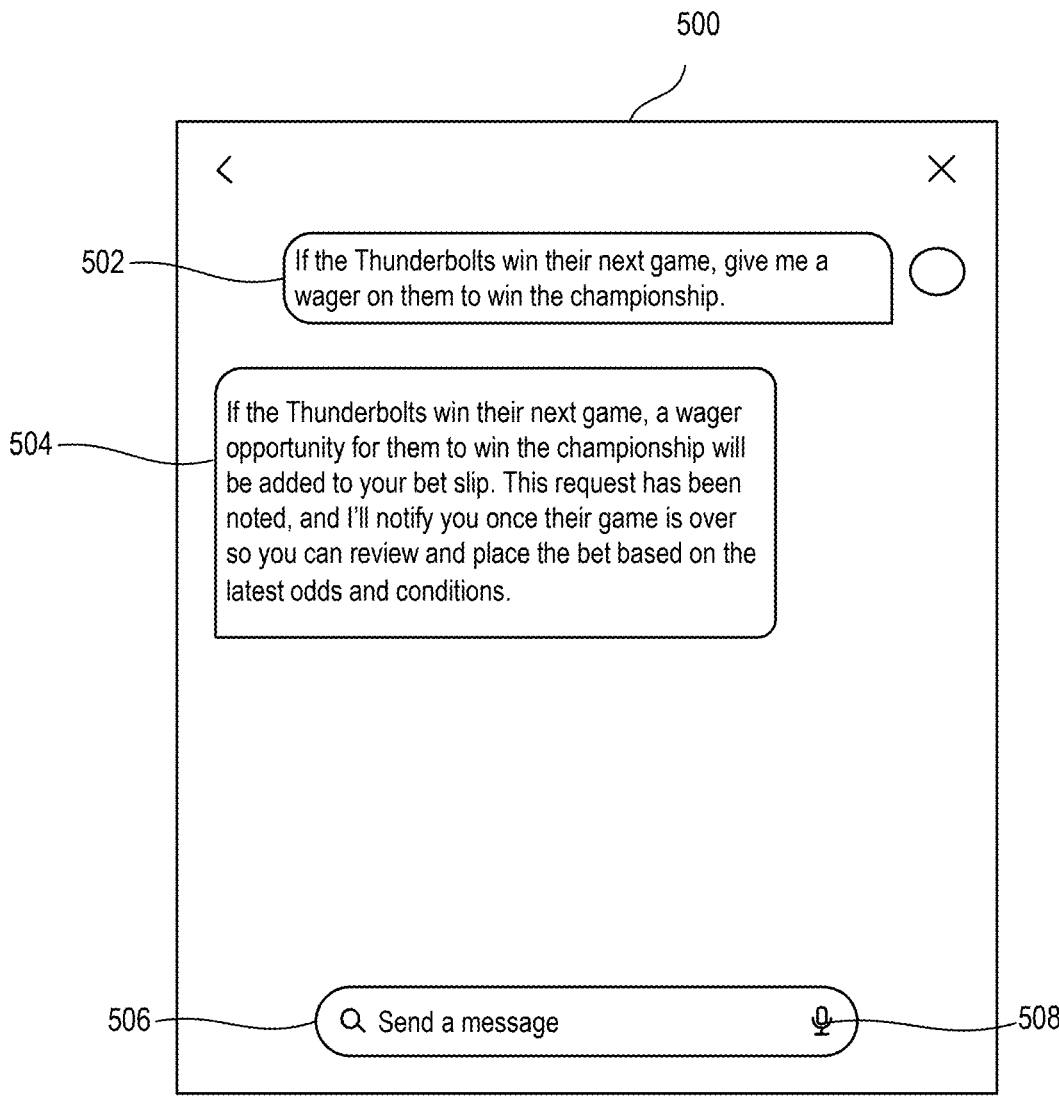

502 — If the Thunderbolts win their next game, give me a wager on them to win the championship.

504 — If the Thunderbolts win their next game, a wager opportunity for them to win the championship will be added to your bet slip. This request has been noted, and I'll notify you once their game is over so you can review and place the bet based on the latest odds and conditions.

506 — Q Send a message    🎤 — 508

The Thunderbolts won their game! Here is your selection for the championship. A winning $10 bet would have a total payout of $38.

510 — ○ NY Thunderbolts · Moneyline

512 — +280

<u>700</u>

702 — Maintain a Plurality of Historical Wager Opportunities

704 — Generate a Training Dataset

706 — Update a Language Model

SYSTEMS AND METHODS FOR GENERATING INSTRUCTIONS FOR FUTURE NETWORK OPTIMIZATION USING LANGUAGE MODELS

CROSS-REFERENCES TO RELATED APPLICATIONS

This application claims the benefit of and priority to U.S. Provisional Patent Application No. 63/741,297, filed Jan. 2, 2025; and claims the benefit of and priority to U.S. Provisional Patent Application No. 63/708,509, filed Oct. 17, 2024; and claims the benefit of and priority to U.S. Provisional Patent Application No. 63/708,492, filed Oct. 17, 2024; and claims the benefit of and priority to U.S. Provisional Patent Application No. 63/708,528, filed Oct. 17, 2024; and claims the benefit of and priority to U.S. Provisional Patent Application No. 63/708,542, filed Oct. 17, 2024; and claims the benefit of and priority to U.S. Provisional Patent Application No. 63/708,504, filed Oct. 17, 2024; and claims the benefit of and priority to U.S. Provisional Patent Application No. 63/711,415, filed Oct. 24, 2024; and claims the benefit of and priority to U.S. Provisional Patent Application No. 63/708,554, filed Oct. 17, 2024; and claims the benefit of and priority to U.S. Provisional Patent Application No. 63/719,406, filed Nov. 12, 2024; and claims the benefit of and priority to U.S. Provisional Patent Application No. 63/741,671, filed Jan. 3, 2025; the contents of each of which are incorporated herein by reference in their entireties for all purposes.

BACKGROUND

Network environments can support communication between multiple computing devices using techniques such as packet-switching. Data transmitted between devices can be synchronized such that multiple devices on the same network access the same information. However, it can be challenging to efficiently synchronize data transmission using conventional networking technology.

SUMMARY

At least one aspect of the present disclosure is directed to a system. The system can include one or more processors coupled to memory. The one or more processors may maintain a plurality of wager opportunities corresponding to a plurality of live events. The one or more processors may receive, from a client device associated with a player profile, a prompt including a condition and a request for a wager recommendation. The one or more processors may generate, using a language model and the prompt, a command to evaluate the condition included in the prompt. The one or more processors may determine that the condition is satisfied based on information retrieved from a data source identified based on the command. The one or more processors may identify a wager opportunity based on the prompt responsive to determining that the condition is satisfied. The one or more processors may provide an output message identifying the wager opportunity.

In some implementations, the condition can correspond to the occurrence of at least one live event within a time period. In some implementations, the one or more processors may determine that the condition is satisfied upon determining that the at least one live event is to occur within the time period. In some implementations, the one or more processors may select the wager opportunity from a database storing information of the plurality of wager opportunities based on at least one keyword in the prompt. In some implementations, the one or more processors may generate the output message using the language model. The output message can identify the wager opportunity and the condition.

In some implementations, the one or more processors may receive, from the client device, a second request corresponding to the wager opportunity. In some implementations, the one or more processors may update the player profile to indicate a wager corresponding to the wager opportunity. In some implementations, the second request can be received responsive to an interaction with a graphical user interface at the client device.

In some implementations, the one or more processors may receive, from at least one external computing system, a message identifying a status of the at least one live event. In some implementations, the one or more processors may determine that the condition is satisfied based on the message. In some implementations, the player profile can identify a second wager opportunity corresponding to a second condition generated based on a second prompt.

In some implementations, the one or more processors may determine that the second condition is not satisfied. In some implementations, the one or more processors may transmit a notification to the client device indicating that the condition is not satisfied and that the second wager opportunity is not executed. In some implementations, the one or more processors may receive a second message including a second condition corresponding to a second wager opportunity. In some implementations, the one or more processors may receive a second prompt confirming the wager opportunity. In some implementations, the one or more processors may generate, using the language model and the second prompt, a command to update the player profile to include the wager opportunity.

At least one aspect of the present disclosure is directed to a method of a system. The method may include maintaining a plurality of wager opportunities corresponding to a plurality of live events. The method may include receiving, from a client device associated with a player profile, a prompt including a condition and a request for a wager recommendation. The method may include generating, using a language model and the prompt, a command to evaluate the condition included in the prompt. The method may include determining that the condition is satisfied based on information retrieved from a data source identified based on the command. The method may include identifying a wager opportunity based on the prompt responsive to determining that the condition is satisfied. The method may include providing an output message identifying the wager opportunity.

In some implementations, the condition can correspond to the occurrence of at least one live event within a time period. In some implementations, the method may include determining that the condition is satisfied upon determining that the at least one live event is to occur within the time period. In some implementations, the method may include selecting the wager opportunity from a database storing information of the plurality of wager opportunities based on at least one keyword in the prompt. In some implementations, the method may include generating the output message using the language model. The output message can identify the wager opportunity and the condition.

In some implementations, the method may include receiving, from the client device, a second request corresponding to the wager opportunity. In some implementations, the method may include updating the player profile to indicate a wager corresponding to the wager opportunity. In some implementations, the second request can be received responsive to an interaction with a graphical user interface at the client device.

In some implementations, the method may include receiving, from at least one external computing system, a message identifying a status of the at least one live event. In some implementations, the method may include determining that the condition is satisfied based on the message. In some implementations, the player profile can identify a second wager opportunity corresponding to a second condition generated based on a second prompt. In some implementations, the method may include determining that the second condition is not satisfied. In some implementations, the method may include transmitting a notification to the client device indicating that the condition is not satisfied and that the second wager opportunity is not executed.

At least one aspect of the present disclosure is directed to a system. The system can include one or more processors coupled to memory. The one or more processors may maintain a plurality of wager opportunities corresponding to a plurality of live events. The one or more processors may receive, from a client device associated with a player profile, a prompt including a condition and a request for a wager recommendation. The condition can correspond to at least one future event. The one or more processors may generate, using a language model and the prompt, output including (i) a command to monitor the condition indicated in the prompt, and (ii) a wager opportunity of the plurality of wager opportunities selected based on the prompt. The one or more processors may determine that the condition corresponding to the at least one future event has been satisfied. The one or more processors may update the player profile to include a wager generated according to the wager opportunity associated with the condition responsive to determining that the condition is satisfied. The one or more processors may provide an indication of the condition was satisfied to the client device.

In some implementations, the condition can indicate an outcome for the at least one future event. In some implementations, the one or more processors may determine that the outcome occurred for the at least one future event to determine that the condition is satisfied. In some implementations, the one or more processors may select the wager opportunity from a database storing information of the plurality of wager opportunities based on at least one keyword in the prompt.

In some implementations, the one or more processors may generate, using the language model, an output message identifying the wager opportunity and the condition. In some implementations, the one or more processors may receive, from the client device, a second request corresponding to the wager opportunity and the condition. In some implementations, the one or more processors may update the player profile to indicate the condition in response to the second request. In some implementations, the one or more processors may receive the second request as part of a second prompt. In some implementations, the one or more processors may generate, using the language model and the second prompt, a second command to update the player profile.

In some implementations, the one or more processors may monitor a status of the at least one future event. In some implementations, the one or more processors may determine that the condition is satisfied upon a change in the status of the at least one future event. In some implementations, the one or more processors may receive, from at least one external computing system, a message identifying the change in the status of the at least one future event.

In some implementations, the player profile can identify a second wager opportunity corresponding to a second condition generated based on a second prompt. The second condition can correspond to a second future event. In some implementations, the one or more processors may receive, prior to determining that the condition is satisfied, a second request to remove an association between the second wager opportunity and the condition in the player profile. In some implementations, the one or more processors may update the player profile to remove the association between the second wager opportunity and the condition in the player profile. In some implementations, the one or more processors may determine that the second condition corresponding to the second future event cannot be satisfied. In some implementations, the one or more processors may transmit a notification to the client device indicating that the second condition cannot be satisfied.

At least one aspect of the present disclosure is directed to a method of a system. The method may include maintaining a plurality of wager opportunities corresponding to a plurality of live events. The method may include receiving, from a client device associated with a player profile, a prompt including a condition and a request for a wager recommendation. The condition can correspond to at least one future event. The method may include generating, using a language model and the prompt, output including (i) a command to monitor the condition indicated in the prompt, and (ii) a wager opportunity of the plurality of wager opportunities selected based on the prompt. The method may include determining that the condition corresponding to the at least one future event has been satisfied. The method may include updating the player profile to include a wager generated according to the wager opportunity associated with the condition responsive to determining that the condition is satisfied. The method may include providing an indication of the condition was satisfied to the client device.

In some implementations, the condition can indicate an outcome for the at least one future event. In some implementations, the method may include determining that the outcome occurred for the at least one future event to determine that the condition is satisfied. In some implementations, the method may include selecting the wager opportunity from a database storing information of the plurality of wager opportunities based on at least one keyword in the prompt.

In some implementations, the method may include generating, using the language model, an output message identifying the wager opportunity and the condition. In some implementations, the method may include receiving, from the client device, a second request corresponding to the wager opportunity and the condition. In some implementations, the method may include updating the player profile to indicate the condition in response to the second request. In some implementations, the method may include receiving the second request as part of a second prompt. In some implementations, the method may include generating, using the language model and the second prompt, a second command to update the player profile.

In some implementations, the method may include monitoring a status of the at least one future event. In some implementations, the method may include determining that the condition is satisfied upon a change in the status of the at least one future event. In some implementations, the method may include receiving, from at least one external computing system, a message identifying the change in the status of the at least one future event.

In some implementations, the player profile can identify a second wager opportunity corresponding to a second condition generated based on a second prompt. The second condition can correspond to a second future event. In some implementations, the method may include receiving, prior to determining that the condition is satisfied, a second request to remove an association between the second wager opportunity and the condition in the player profile. In some implementations, the method may include updating the player profile to remove the association between the second wager opportunity and the condition in the player profile. In some implementations, the method may include determining that the second condition corresponding to the second future event cannot be satisfied. In some implementations, the method may include transmitting a notification to the client device indicating that the second condition cannot be satisfied.

At least one aspect of the present disclosure is directed to a system. The system can include one or more processors coupled to memory. The one or more processors may maintain a plurality of historical wager opportunities. The one or more processors may generate, using the data corresponding to the plurality of historical wagers, a training dataset including a plurality of training examples. At least one training example can include (i) a respective input prompt including a request indicating a conditional intent relating to wager opportunities, the conditional intent specifying a condition to be evaluated for the request, and (ii) a respective output message identifying one or more commands to evaluate the condition, the one or more commands derived based on the conditional intent and the request. The one or more processors may update a language model using the training dataset.

In some implementations, the one or more processors may classify the condition in a first training example of the plurality of training examples. In some implementations, the one or more processors may select the one or more commands for the first training example based on the classification of the condition. In some implementations, the condition for the first training example can identify an occurrence of an event. In some implementations, the one or more processors may select the one or more commands for the first training example that cause determination of whether the occurrence of the event is satisfied.

In some implementations, the respective input prompt can further include data corresponding to the live event retrieved from one or more databases. In some implementations, the respective input prompt of a first training example of the plurality of training examples can include a plurality of conditions. In some implementations, the one or more processors may generate a plurality of commands for the respective output message of the training example. In some implementations, the one or more commands can be identified using at least one command token in the respective output message of each of the plurality of training examples.

In some implementations, the request of a first training example of the plurality of training examples can specify a future condition to monitor. In some implementations, the one or more processors may generate the respective output message of the first training example to include at least one command to monitor the future condition. In some implementations, the at least one command includes a command to update a list of conditions to monitor at periodic intervals. In some implementations, the one or more processors may generate the respective output message of the first training example to include at least one second command to perform an action determined from the respective input prompt of the first training example upon determining that the future condition is satisfied. In some implementations, the action can include an operation to update a player profile with an indication of a wager opportunity.

At least one aspect of the present disclosure is directed to a method of a system. The method may include maintaining a plurality of historical wager opportunities. The method may include generating, using the data corresponding to the plurality of historical wagers, a training dataset including a plurality of training examples. At least one training example can include (i) a respective input prompt including a request indicating a conditional intent relating to wager opportunities, the conditional intent specifying a condition to be evaluated for the request, and (ii) a respective output message identifying one or more commands to evaluate the condition, the one or more commands derived based on the conditional intent and the request. The method may include updating a language model using the training dataset.

In some implementations, the method may include classifying the condition in a first training example of the plurality of training examples. In some implementations, the method may include selecting the one or more commands for the first training example based on the classification of the condition. In some implementations, the condition for the first training example can identify an occurrence of an event. In some implementations, the method may include selecting the one or more commands for the first training example that cause determination of whether the occurrence of the event is satisfied.

In some implementations, the respective input prompt can further include data corresponding to the live event retrieved from one or more databases. In some implementations, the respective input prompt of a first training example of the plurality of training examples can include a plurality of conditions. In some implementations, the method may include generating a plurality of commands for the respective output message of the training example. In some implementations, the one or more commands can be identified using at least one command token in the respective output message of each of the plurality of training examples.

In some implementations, the request of a first training example of the plurality of training examples can specify a future condition to monitor. In some implementations, the method may include generating the respective output message of the first training example to include at least one command to monitor the future condition. In some implementations, the at least one command can include a command to update a list of conditions to monitor at periodic intervals. In some implementations, the method may include generating the respective output message of the first training example to include at least one second command to perform an action determined from the respective input prompt of the first training example upon determining that the future condition is satisfied. In some implementations, the action can include an operation to update a player profile with an indication of a wager opportunity.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a" "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2 illustrates an example flow diagram of a method for generating instructions for network optimization using language models, in accordance with one or more implementations;

FIG. 4 illustrates an example flow diagram of a method for generating instructions for future network optimization using language models, in accordance with one or more implementations;

FIGS. 5 and 6 illustrate an example implementation of an application interface in connection with FIG. 4, in accordance with one or more implementations;

DETAILED DESCRIPTION

Figure 1:
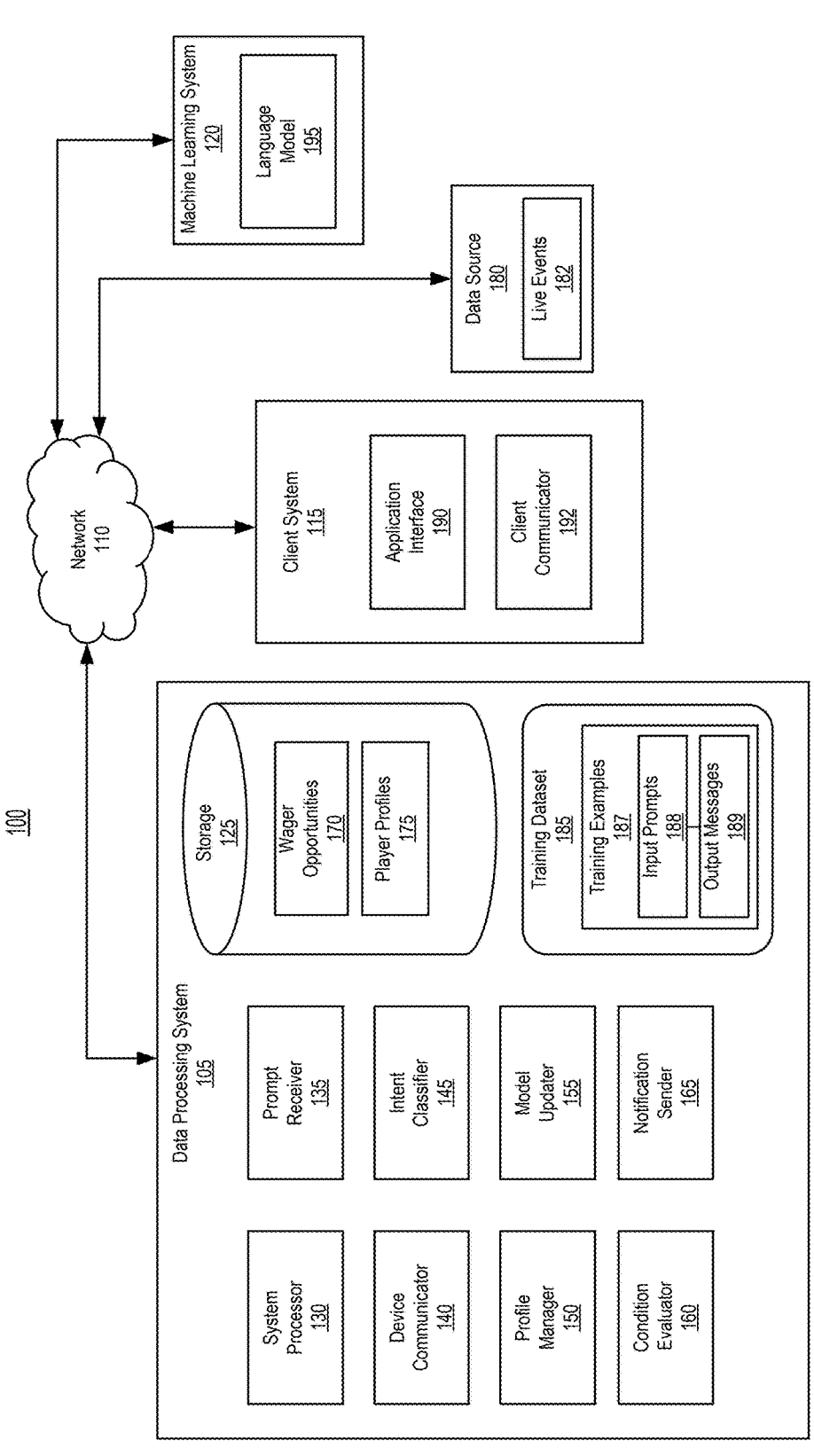
FIG. 1 illustrates a block diagram of an example system for providing machine-learning system functionalities, in accordance with one or more implementations.

Below are detailed descriptions of various concepts related to, and implementations of, techniques, approaches, methods, apparatuses, and systems for providing interactive game experiences. The various concepts introduced above and discussed in greater detail below may be implemented in any of numerous ways, as the described concepts are not limited to any particular manner of implementation. Examples of specific implementations and applications are provided primarily for illustrative purposes.

Natural language processing techniques can be applied across a wide range of computing environments to generate responses or other outputs based on natural language prompts. Language models and other machine-learning models can be used in various applications, including but not limited real-time information retrieval interfaces, which can be limited according to processing capacity of the systems executing such machine-learning models. To perform such operations, a language model can process input data sequences that represent prompts, contextual information, and other relevant data.

As language models typically include a large number of parameters, invoking such language models typically requires significant processing resources that make language models challenging to use for certain applications (e.g., real-time or near real-time applications. The number of operations and the amount of memory used to process a prompt is generally influenced by the size of the input context provided to the language model. Input contexts can include historical exchanges, metadata, and/or external reference information that may be relevant to generating an accurate or contextually suitable output. Generating suitable outputs typically involves providing large amounts of information as input to language models, which can significantly hinder performance, both in terms of accuracy and execution performance (e.g., computing resource utilization).

Conventional techniques for supplying input contexts to language models fail to ameliorate these issues. For example, conventional approaches often require sending large contexts, which often include an entire accumulated input, across multiple requests to achieve a requested output. Increasing the size of the input context results in increased network latency and bandwidth consumption. During output generation, executing language models with large input contexts causes processor load and increased memory allocation that grow at rates that reduce the feasibility of using language model in many real-time or near real-time applications. As a result, existing systems experience limited throughput, excessive memory consumption, and elevated network resource usage.

The techniques described herein address these and other issues by generating targeted input contexts for a language model that include only data determined to be relevant to a given prompt. In general, the techniques can select prompt-specific subsets of available context data based on one or more classification processes and/or rule-based policies. By constructing an input context from only the selected subset, the techniques described herein can significantly reduce the processing resources needed to process the input context without omitting information that is pertinent to generating an accurate output. Such context selection operations can be perform in connection with session-based data persistence, such that follow-on prompts can be processed according to previously stored interaction data, in some implementations.

By selectively reducing the contents of an input context based on prompt relevance and by avoiding redundant transmission of static context data, the techniques described herein can lower processing time and memory requirements for language model execution. Network bandwidth consumption can also be reduced because only incremental or newly relevant data is transmitted for follow-on prompts, rather than the entire accumulated context. These improvements can provide faster response times for multi-turn interactions, sustain throughput in high-load scenarios, and enable the use of large-scale language models within low-latency applications where conventional approaches would exceed performance constraints.

In further detail, various implementations of the systems and methods described herein can be used to reduce processor utilization and memory consumption when processing prompts with additional contextual input via one or more language models or other machine-learning models. For example, a system can maintain one or more data structures storing specific information that can be automatically selected for inclusion in an input context of the language/ machine-learning models. As noted above, the computing resources (e.g., computing time and/or memory/caching consumption) used to execute language models or other natural language processing functions on computers increase at least quadratically with the size of the input context (e.g., the input data to be processed). Executing language models using existing techniques therefore restricts the context size according to the expected/target processing time of a corresponding request. For real-time or near real-time applications, such extended delays make using language models impossible to use.

To address these challenges, the systems and methods described herein can dynamically generate an input context that includes a subset of data that can be used to carry out requested computing operations. Such automatic selection may be performed, for example, according to intent classification operations executed using additional machine-learning models and/or specific rules-based selection policies. By automatically selecting certain data to be included in the input context, the systems and methods described herein automatically limit the input context for the language model to a targeted subset of available data, thereby reducing the latency (e.g., processing time) and memory allocation required to carry out the requested operations using the language model. As a result, the systems and methods described herein operate more efficiently, and allow for the use of language models in real-time or near real-time processing applications, which would otherwise be impossible to implement using existing techniques.

In various implementations, the technical solutions can implement various unconventional approaches that provide increased performance compared with the existing techniques, including dynamic updating of databases indicating definition data and/or context information, as well as dynamic training/fine-tuning/updating of language model parameters, to facilitate the processing of various input prompts to generate commands for the computing system to evaluate conditions related to events occurring within a specific time period or for future events. The technical solutions can dynamically update language model parameters to improve the language model's ability to accurately process conditional intents and generate commands based on those conditions.

In various implementations, the technical solutions described herein can address the challenge of hallucinations in the language model outputs, where the model generates responses that are plausible but incorrect. For example, by generating improved input contexts with particular data from up-to-date data sources using structured input, the systems and methods described herein can reduce the likelihood of hallucinatory responses from the language model and improve the accuracy of generated commands that cause the computing system to evaluate event-based conditions. Some implementations described herein can perform additional training and fine-tuning processes that update the language models to adapt to new data and correct any inaccuracies in their responses. Unlike conventional approaches, which fail to produce accurate and consistent language model output, the techniques described herein can process data for the language models to reduce instances of hallucinations and increase output precision and accuracy.

The techniques described herein include features and functionalities relating to improved machine learning for processing prompt data and generating instructions. For purposes of reading the descriptions of the various implementations below, the following descriptions of the sections of the Specification and their respective contents may be helpful:

I. Section A describes a remote or local computing environment that may be useful for providing machine-learning system functionalities.

II. Section B describes systems and methods for generating instructions for network optimization using language models.

III. Section C describes systems and methods for generating instructions for future network optimization using language models.

IV. Section D describes systems and methods for training language models to generate instructions for network optimization.

V. Section E describes a computing and networking environment that may be useful for practicing the implementations described herein.

A. Remote or Local Computing Environment for Providing Machine-Learning System Functionalities Referring to FIG. 1, depicted is a block diagram of an example system 100 for training, updating, or fine-tuning language models using input from distributed computing environments. In FIG. 1, the system 100 can include at least one data processing system 105, at least one network 110, at least one client system 115, and at least one machine learning system 120. In FIG. 1, the data processing system 105 can include at least one storage 125, at least one system processor 130, at least one prompt receiver 135, at least one device communicator 140, at least one intent classifier 145, at least one profile manager 150, at least one model updater 155, at least one condition evaluator 160, at least one notification sender 165, and at least one training dataset 185. The storage 125 can include one or more wager opportunities 170, one or more player profiles 175, and one or more data sources 180. The data source 180 can include up-to-date information relating to one or more live events 182 and may be external to the data processing system 105, as shown. The training dataset 185 can include one or more training examples 187. The training examples 187 can include one or more input prompts 188 and one or more output messages 189. The client system 115 can include at least one application interface 190 and at least one client communicator 192. The machine learning system 120 can include at least one language model 195.

The data processing system 105 can include a physical computer system operatively coupled with one or more components of the system 100. The data processing system 105 can include a cloud system, a server, a distributed remote system, or any combination thereof. The data processing system 105 can include a virtual computing system, an operating system, and a communication bus to effect communication and processing. The data processing system 105 can include physical infrastructure, such as physical servers, storage devices, and network equipment housed in data centers. The data processing system 105 can include a virtual computing system, which can include cloud-based virtual machines or containers for running applications and services. The data processing system 105 can include an operating system that can function as the core manager, allocating resources, configuring processes, and facilitating interaction between hardware and applications. The data processing system 105 can include a communication bus that can facilitate communication between different components within the system. The data processing system 105 can connect with external systems to allow for data exchange and service delivery to end users.

The client system 115 (sometimes referred to as a "client device 115") can include a computing system that can be used to access the functionality of the data processing system 105. The client system 115 can include a smart phone, mobile device, laptop computer, desktop computer, one or more servers, or any other type of computing device. The client system 115 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language.

The client system 115 can include one or more devices to receive input from a user and/or to provide output to a user. For example, the output capabilities of the application interface 190 can be presented by a display device that provides visual feedback to the user. The display device can enhance the user experience with electronic displays, such as liquid crystal displays (LCD), light-emitting diode (LED) displays, or organic light-emitting diode (OLED) displays. The electronic displays can implement interactive features, including capacitive or resistive touch input, allowing for multi-touch functionality. The input functionalities can include a keyboard, mouse, or an integrated touch-sensitive panel on the display device, but are not limited thereto.

The machine learning system 120 can include one or more machine learning models trained on datasets. The machine learning system 120 can include a cloud system, a server, a distributed remote system, or any combination thereof. The machine learning system 120 can include, but is not limited to including, at least a central processing unit (CPU), a graphics processing unit (GPU), a tensor processing unit (TPU), or the like. The machine learning system 120 can include a memory operable to store one or more instructions for operating components of the machine learning system 120 and operating components operably coupled to the machine learning system 120. For example, the instructions can include firmware, software, hardware, operating systems, or embedded operating systems, among others. The machine learning system 120 can be internal to the data processing system 105. The machine learning system 120 can exist external to the data processing system 105 and can be accessed via the network 110. In some implementations, the machine learning system 120 implements or otherwise provides access to one or more application programming interfaces (APIs), via which the data processing system 105 and/or the client system 115 can access the language model 195 or other functionality of the machine learning system 120.

The network 110 can include computer networks such as the Internet, local, wide, metro, or other area networks, intranets, satellite networks, other computer networks such as voice or data mobile phone communication networks, and combinations thereof. The data processing system 105 of the system 100 can establish a communication session via the network 110, for example, with the client systems 115 and/or the machine learning system 120. Establishing a communication session can refer to creating a temporary connection between two or more devices to exchange information. For example, this can include setting up a data exchange session between the client system 115 and the data processing system 105. The network 110 may be any form of computer network that can relay information between the data processing system 105, the client system 115, the machine learning system 120, and one or more information sources, such as web servers or external databases, amongst others.

The network 110 can include the Internet and/or other types of data networks, such as a local area network (LAN), a wide area network (WAN), a cellular network, a satellite network, or other types of data networks. The network 110 can include any number of computing devices (e.g., computers, servers, routers, network switches, etc.) that are configured to receive and/or transmit data within the network 110. The network 110 can further include any number of hardwired and/or wireless connections. Any or all of the computing devices described herein (e.g., the data processing system 105, the client system 115, the machine learning system 120, etc.) can communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein can communicate wirelessly with the computing devices of the network 110 via a proxy device (e.g., a router, network switch, or gateway).

The data processing system 105 can include the storage 125. The storage 125 can be a computer-readable memory that can store or maintain any of the information described herein. The storage 125 can store data associated with the system 100. The storage 125 can include one or more hardware memory devices to store binary data, digital data, or the like. The storage 125 can include one or more electrical components, electronic components, programmable electronic components, reprogrammable electronic components, integrated circuits, semiconductor devices, flip flops, arithmetic units, or the like. The storage 125 can include at least one of a non-volatile memory device, a solid-state memory device, a flash memory device, or a NAND memory device. The storage 125 can include one or more addressable memory regions disposed on one or more physical memory arrays. A physical memory array can include a NAND gate array disposed on, for example, at least one of a particular semiconductor device, an integrated circuit device, or a printed circuit board device. In an aspect, the storage 125 can correspond to a non-transitory computer readable medium. In an aspect, the non-transitory computer readable medium can include one or more instructions executable by the system processor 130.

In some implementations, the storage 125 can store, modify, or otherwise maintain any of the information described herein using one or more databases. The storage 125 can be accessed using one or more memory addresses, index values, or identifiers of any item, structure, or region maintained in the storage 125. The storage 125 can be accessed by the components of the data processing system 105, the client system 115, the machine learning system 120, or any other computing device described herein, via the network 110. The storage 125 can be internal to the data processing system 105. The storage 125 can exist externally to the data processing system 105 and can be accessed via the network 110. For example, the storage 125 can be distributed across many different computer systems (e.g., a cloud computing system) or storage elements and may be accessed via the network 110 or a suitable computer bus interface.

The data processing system 105, the client system 115, or the machine learning system 120 can store in the storage 125 the results of any or all computations, determinations, selections, identifications, generations, constructions, or calculations in one or more data structures indexed or identified with appropriate values. Any or all values stored in the storage 125 can be accessed by any computing device described herein, such as the data processing system 105, the client system 115, or the machine learning system 120, to perform any of the functionalities or functions described herein. In implementations where the storage 125 forms a part of a cloud computing system, the storage 125 can be a distributed storage medium in a cloud computing system and can be accessed by any of the components of the data processing system 105, the client system 115, the machine learning system 120, or by any other computing devices described herein.

The storage 125 can store wager opportunities 170 for one or more past events. The wager opportunities 170 can include event information, identifying the specific event each wager is tied to, such as team names, game details, etc. The wager opportunities 170 can include wager options, including different types of bets available for each event, such as moneyline, point spread, or over/under, among other markets. The wager opportunities 170 can include odds, for example, the payout ratio associated with each wager and how much a winning wager returned. The wager opportunities 170 can include an indication of a wager recommendation. For example, the wager opportunities 170 can include an indication of a parlay or a single bet recommendation. In some implementations, the wager opportunities 170 can include flags or markers indicating whether a wager is a parlay or a single bet, for instance. The wager opportunities 170 can include a record of the number of wagers placed.

In some embodiments, the wager opportunities 170 can include data corresponding to historical wager opportunities. The historical wager opportunities can correspond to past wagering opportunities. For example, the historical wager opportunities can include details about the wagers placed on past games, such as the types of wagers, the odds offered, the outcomes of those wagers, and the volume of wagers made on specific events or outcomes. The wager opportunities 170 can be used to calculate or adjust the odds associated with the current wager opportunities. In some implementations, odds associated with wager opportunities 170 can be dynamically adjusted based on various factors, such as live event data/developments, fluctuations in betting volume, and historical wager patterns, among others. In some implementations, upon detecting events, such as scores, timeouts, updates to bet slips, wagers added or removed, or legs added or removed, the data processing system 105 can recalculate and adjust wager odds. In some implementations, the data processing system 105 can track the popularity of specific wager types or specific wager opportunities, such as single game parlays, quick single game parlays (Quick SGPs), by tracking the number of times the corresponding wager types/opportunities have been selected. For example, each wager opportunity 170 can include or be associated with a counter that is incremented each time the wager opportunity is selected by a player via the data processing system 105. In some implementations, based on prompts and betting trends, the data processing system 105 can categorize or flag wager opportunities 170 as components or legs of parlay wagers.

The storage 125 can store one or more player profiles 175 associated with a user (sometimes referred to herein as a "player") of a client system 115. A player profile 175 of a player can be a user profile that includes information about the player and information about one or more of the client systems 115 used to access the data processing system 105 using the player profile 175. For example, identifiers of the player profile 175 can be used to access the functionality of the data processing system 105 (e.g., by logging into the data processing system 105 via one or more web-based interfaces). The identifiers can include a username, a password, an e-mail address, a phone number, a personal identification number (PIN), a secret code-word, and device identifiers for use in a two-factor authentication technique, among others. The player profile 175 can store information about wagers, games, and live events that are performed by the player via the data processing system 105.

The player profile 175 can store a credit balance, wager information or side wager information (e.g., an amount of a wager/side wager, a timestamp associated with a wager/side wager, information about gaming conditions or game state information that resulted in a side wager, a client system identifier of the client system 115 that was used to place the wager/side wager, etc.). The player profile 175 can store information about the client system 115 used to access the data processing system 105, such as an IP address, a MAC address, a GUID, a player profile name (e.g., the name of a user of the client system, etc.), and a device name, among others. In some implementations, the player profile 175 can be generated by the data processing system 105 in response to the player profile generation request transmitted by the client system 115 associated with a client device. The player profile generation request can include any of the player profile information described herein.

The system 100 is shown as including a data source 180, which may be accessible via the network 110. The data source 180 can be a computing system, server, data repository, or any other source of data that can store, provide, or otherwise maintain any of the information relating to live events 182 described herein. In some implementations, the data source 180 can include hardware, software, or any combination thereof. The data source 180 may include information used to inform betting decisions, such as odds values for wager opportunities 170 as well as information relating to the outcomes for different wager opportunities 170. In some implementations, the data source 180 can include one or more components to facilitate data collection, processing, storage, and delivery, among others. For example, the data source 180 can include APIs and web scrapers to collect data from various sources, such as official sports league websites, betting platforms, and third-party data providers. In some implementations, the data source 108 may be or include one or more computing systems of third-party data providers, such as official sports league websites, or betting platforms, among others.

In some implementations, the data source 180 can include and provide real-time or near real-time data feeds that provide live updates on scores, player statistics, and other relevant metrics tied to live events 182. The live event 182 can correspond to a specific ongoing sporting event and can include an identifier that allows the data source 180 to continuously monitor and update relevant data, including event progression, player performance, and associated wagering opportunities. The live event identifier can be used as a reference point, such that the data source 180 can accurately associate updates with the correct live event 182. The live event identifier can be assigned when a sporting event is scheduled and can be based on factors such as the league or tournament to which the event belongs, the event's date and time, the participating teams or players, and the venue where the event is held. The data source 180 can include and/or integrate with sports leagues or infrastructures to receive live data feeds, which can include/provide the event identifier for each game. The live data feeds can provide the data source 180 with continuous updates tied to the live event 182, such that the data can be properly categorized and monitored in real-time or near real-time. The data source 180 can store the live event identifiers along with related data such as scores, player statistics, and other metrics, allowing for seamless updates and accurate tracking of wagering opportunities as the live event 182 progresses. The data processing system 105 can access any of the information provided/maintained by the data source 180 via the network 110. In some implementations, the data source 180 can be internal to, or may otherwise be a component of, the data processing system 105.

The data processing system 105 can include one or more training datasets 185. A training dataset 185 can include a collection of structured data used to train/update the language model 195 (or adapters therefor, or other machine learning models described herein, etc.) to perform specific tasks. The data processing system 105 can collect data from sources such as sports data providers, betting platforms, player interactions, and more, through data extraction to generate/update/provide the training examples 187 of the training dataset 185. In doing so, the data processing system 105 can address missing values, inconsistencies, and outliers to maintain data quality, for example, through data cleaning or preprocessing. The data processing system 105 can aggregate data from multiple sources to generate training datasets 185, which may include retrieving historical data from one or more data sources 180. In some implementations, the data processing system 105 can generate additional training examples for training datasets 185, for example, using data augmentation techniques. The training dataset 180 can be labeled (where the outcome is known) or unlabeled (where the outcome is not known), depending on the type of learning, such as supervised or unsupervised learning.

In some implementations, the training dataset 185 can include function calling datasets. The function calling datasets can include prompt-response pairs, where the response can include calling specific functions to execute any of the operations performed by the data processing system 105. In some implementations, the training dataset 185 can include conversational datasets, which can be used for training and evaluating the language model 195. The conversational datasets can include collections of comments, conversations, or other input information relating to one or more wager opportunities 170 or other information requested by one or more players. In some implementations, the data processing system 105 can generate artificial data to supplement training datasets 185 using synthetic data generation techniques. Once the training dataset 185 is generated, the language model 195 can undergo an iterative learning process. For example, the language model 195 can be presented with prompts corresponding to various conditions associated with live events 182 or wager opportunities associated with live events 182, and the language model 195 can generate instructions for the data processing system 105 to evaluate those conditions. These commands or instructions can be compared to the known outcomes, and the model's parameters can be adjusted accordingly.

The training dataset 180 can be comprised of individual data points, referred to as training examples 187. The training examples 187 can be used to train/fine-tune/update a language model 195 to generate correct commands and natural language output corresponding to conditions specified in wager-related requests/prompts. In some implementations, one or more training examples 187 can be used as part of an evaluation dataset to determine performance metrics of a language model 195, such as exact match (EM), F1 score, accuracy, precision, and recall, among others. For example, the condition "Give me a wager on the Thunderbolts if they are playing today" can be used to evaluate whether the language model 195 generates a command instructing the data processing system 105 to identify the Thunderbolts' schedule and determine if they are playing today. In some implementations, the training dataset 185 can organize each training example 187 with relevant metadata, including player names, team names, sports, wager types, and conditions associated with the wager opportunities.

In some implementations, the training examples 187 can include variations in user prompts that correspond to changes in conditional intent. The variations can relate to at least one of the syntactic, semantic, or contextual patterns of the request, each affecting how the language model 195 generates commands to evaluate conditions. For example, a syntactic variation may modify the structure of a conditional intent, such as changing "Give me a wager if the Thunderbolts win" to "Can you place a bet if the Thunderbolts win?". In this example, both requests convey the same condition but require the language model 195 to process different phrasing. A semantic variation may adjust the meaning of the condition, such as changing "Give me a wager on the Thunderbolts if the Thunderbolts win" to "Bet on the Firebirds if the Thunderbolts lose", which shifts the outcome and wager recommendation. A contextual variation may modify the prompt from "Give me a wager on the Thunderbolts if the Thunderbolts win" to "Give me a wager on the Thunderbolts if the Thunderbolts win their next playoff game", where the context of the playoff game is to be factored into the evaluation of the condition.

The training examples 187 can be labeled (e.g., where the outcome of the condition is known) or unlabeled (where the outcome is unknown), depending on the learning type, such as supervised or unsupervised learning. In supervised learning, the training examples 187 can include labeled examples with conditional intents, such as "Give me a wager on the Thunderbolts if the King scores a touchdown," with the condition tied to a specific outcome (e.g., a specific player scoring a touchdown). In unsupervised learning, techniques can be applied to identify patterns within unlabeled examples, such as detecting specific betting behaviors or frequently used conditions in wager requests. Once the training examples 187 are provided, the language model 195 can undergo iterative learning to refine its ability to understand and generate outcomes based on intents corresponding to conditions.

Each training example 187 can include an input prompt 188 and a corresponding output message 189. The training example 187 can include pairs of input prompts 188 and output messages 189, which can be used to train/update the language model 195 and/or adapters therefor. The input prompt 188 can include a request indicating a conditional intent (e.g., an intent corresponding to a condition specified in the prompt) related to wager opportunities. For example, the input prompt could be, "If the Thunderbolts win tonight, give me a wager on the Firebirds for their next game". In this example, the conditional intent can indicate the user's desire to identify a relevant wager opportunity associated with the Firebirds' next game, while the condition specifies that the Thunderbolts must win their game. In another example, the input prompt could be, "Give me a wager on the Thunderbolts if the Thunderbolts are playing tonight's game". In this example, the input prompt indicates a conditional intent, where the intent of the user is to place a bet on the Thunderbolts, and the condition that is to be satisfied is whether the Thunderbolts are playing tonight. The language model 195 can be trained to process the input prompt and generate a command for the data processing system 105 to evaluate the specified conditions.

In some implementations, the input prompt 188 can include data corresponding to the live event 182 retrieved from the data source 180. For example, a training input prompt 188 could be, "If the Thunderbolts are leading by 10 points with 5 minutes left, give me a wager on the Thunderbolts". In this example, the input prompt 188 specifies a condition based on live event data (e.g., Thunderbolts' score and time remaining). The language model 195 can be trained to process the input prompt and generate a command for the data processing system 105 to evaluate the live event data retrieved from the data source 180, determining whether the condition is satisfied (e.g., Thunderbolts leading by 10 points with 5 minutes left). If the condition is satisfied, the command generated by the language model 195 will cause the data processing system 105 to identify and present relevant wager opportunities on the Thunderbolts, such as placing a bet on the Thunderbolts to win.

In some implementations, the input prompt 188 can specify any number of conditions, allowing a user's request to specify multiple requirements that are to be satisfied before a wager or action is executed. The input prompts 188 can be used to teach the language model 195 how to generate commands for the data processing system 105 to evaluate multiple conditions. For example, the input prompt 188 can include combined conditions such as, "If the Thunderbolts score a touchdown and the Cyclones fail to score on their next drive, give me a wager on the Thunderbolts". In some implementations, sequential conditions can be specified, such as, "If the Thunderbolts win the first quarter and the Cyclones score the first touchdown in the second quarter, give me a wager on the Thunderbolts to win the game". In some implementations, the input prompt 188 can include complex conditions, such as "If the Thunderbolts' quarterback throws for more than 300 yards and the Cyclones have less than 100 rushing yards, bet on the Thunderbolts to cover the point spread". The language model 195, through these training input prompts 1855, can be trained to generate commands for the data processing system 105 to evaluate each condition before identifying a relevant wager opportunity associated with the event.

The output messages 189 can identify one or more commands to evaluate the conditions specified in the input prompt. The commands can be derived based on the conditional intent and the user's request, and can be used to train the language model 195. For example, an input prompt such as "If the Thunderbolts score more than 110 points, give me wager on the Thunderbolts for their next game" can result in an output message 189 that includes commands such as "Command 1: Check the Thunderbolts' final score" and "Command 2: If the Thunderbolts scored more than 110 points, identify potential wager opportunities associated with their next game". The commands can be derived by the language model 195 based on the conditional intent (e.g., the user's desire to place a bet on the Thunderbolts) and the specific conditions provided in the request (e.g., the Thunderbolts' score). The output messages 189 can cause the language models 195 to follow the intended logic of the user's request by evaluating the conditions before generating commands for the data processing system 105.

In another example, the input prompt "Give me a wager on the Thunderbolts if they're playing tonight" can result in an output message 189 that includes commands to evaluate the conditions specified in the prompt. The commands are derived based on the conditional intent (e.g., the user's request to place a bet on the Thunderbolts) and the specific conditions provided in the input (e.g., whether the Thunderbolts have a game scheduled tonight). In this example, the output message can include commands such as "Command 1: Check if the Thunderbolts have a game scheduled for tonight" and "Command 2: If the Thunderbolts are playing, identify potential wager opportunities based on the game". These commands are generated by the language model based on the user's conditional intent and can be used to train the language model to process similar requests.

In some implementations, the output message 189 of a training example 187 can include one or multiple commands to train the language model 195 to learn how to generate commands for the data processing system 105. The commands can be specific instructions or actions that cause the data processing system 105 to evaluate the conditions specified in the prompt. In some implementations, for complex requests, a single output message 189 can include multiple commands, training the language model 195 how to generate commands that cause the data processing system 105 to process conditions for multi-step processes. For example, an output message can include, "Command 1: Check the Thunderbolts' final score" and "Command 2: If the Thunderbolts scored less than 100 points, give me a wager on the Firebirds for their next game". In this example, command tokens such as "Command 1" and "Command 2" can be used to identify each step within the output message 189. In another example, in response to the prompt, "Give me a wager if the Thunderbolts are playing tonight's game", the output message can include, "Command 1: Check if the Thunderbolts are scheduled to play tonight" and "Command 2: If the Thunderbolts are playing, identify potential wager opportunities".

It should be understood that the above examples are provided for clarity, and that any suitable format for commands/functions may be provided as part of the output messages 189. For example, commands may be specified in a machine-readable format, such as a binary format, an encoded format, and/or a structured format (e.g., a JavaScript Object Notation (JSON) format, an eXtensible Hypertext Language (XML) format, etc.). In some implementations, commands/functions and/or parameters thereof may be specified using or more specialized tokens that represent the commands/functions/parameters. These tokens can be used to distinguish between different commands, such that the data processing system 105 can execute each action correctly, for example, based on the conditions of the user's request.

In some implementations, the output messages 189 of the training example 187 can include at least one command to train the language model 195 to generate instructions for the data processing system 105 to monitor a future condition. The output messages 189 can train the language model 195 how to generate commands that cause the data processing system 105 to monitor and evaluate conditions over time. For example, the command can cause the data processing system 105 to update a list of conditions to monitor at periodic intervals. The data processing system 105 can continuously monitor and check for the occurrence of a specified event or condition. For instance, an input prompt could be, "If the Thunderbolts win this game, give me a wager on the Thunderbolts for their next game". The corresponding output message 189 can include commands, such as "Command 1: Monitor the Thunderbolts' current game" and "Command 2: If the Thunderbolts win, identify potential wager opportunities associated with the Thunderbolts' next game". These output messages 189 can train the language model 195 to generate a list of conditions for the data processing system 105, which can continuously monitor and check for the occurrence of the specified event (e.g., the Thunderbolts winning the game). The data processing system 105 can add the condition to a list of commands and periodically monitor the list, such that the condition is evaluated, and the corresponding action is triggered when the condition is satisfied.

In some implementations, the output messages 189 can be used to train the language model 195 to generate commands that cause the data processing system 105 to perform subsequent actions, such as updating the player profile, once a future or present condition is satisfied. For example, the first command can instruct the data processing system 105 to monitor the Thunderbolts' current game (e.g., "Command 1: Monitor the Thunderbolts' current game"). Upon determining that the Thunderbolts won, the second command can cause the data processing system 105 to update to the player profile 175 (e.g., "Command 2: Update the player profile to indicate the relevant wager opportunity associated with the Thunderbolts' next game").

The data processing system 105 can include the system processor 130. The system processor 130 can execute one or more instructions associated with the data processing system 105. The system processor 130 can include an electronic processor, an integrated circuit, or the like, including one or more of digital logic, analog logic, digital sensors, analog sensors, communication buses, volatile memory, nonvolatile memory, and the like. The system processor 130 can include, but is not limited to, at least one central processing unit (CPU), graphics processing unit (GPU), physics processing unit (PPU), tensor processing unit (TPU), embedded controller (EC), or the like. The system processor 130 can include a memory operable to store or storing one or more instructions for operating components of the system processor 130 and operating components operably coupled to the system processor 130. For example, the one or more instructions can include one or more of firmware, software, hardware, operating systems, or embedded operating systems. The system processor 130 or the data processing system 105 can include one or more communication bus controllers to effect communication between the system processor 130 and the other elements of the data processing system 105.

The data processing system 105 can include the prompt receiver 135. The prompt receiver 135 can be or include any script, file, program, application, set of instructions, or computer-executable code that is configured to process input data in the form of a prompt. The prompt receiver 135 can include hardware, software, or any combination thereof. A prompt can include any user-provided command, request, or text data. The prompt can include a request or information relating to bet placement, such as an indication of a wager type, a wager amount, selecting specific live events, or determining specific outcomes. The prompt receiver 135 can receive the prompt from the client system 115 in natural language (e.g., a text string). The prompt receiver 135 can receive prompts through user interactions with the application interface 190. User interactions can include clicking buttons, entering text, or using voice commands within one or more application interfaces 190, among others. In some implementations, the prompt receiver 135 can expose an API endpoint, allowing other applications or systems to send prompts in structured formats such as JSON or XML. In some implementations, the prompt receiver 135 can subscribe to a message queue where prompts are published by other components/devices of the system 100, for example, according to a publisher-subscriber communication protocol. In some implementations, the prompt receiver 135 can identify specific events or triggers, such as user actions or system state changes, which can generate prompts. In some implementations, the prompt receiver 135 can process prompts loaded from files stored on the data processing system 105.

In some implementations, the prompt receiver 135 can parse and process the prompts to extract information, such as wager type, amount, conditions associated with events, and game selections, among others. The prompt receiver 135 can execute functions based on the prompt's content. In some implementations, the prompt receiver 135 can perform validation checks. For example, the prompt receiver 135 can validate the requested wager against current betting odds or predefined rules. The prompt receiver 135 can validate the sufficiency of the user's account balance via the profile manager 150. The prompt receiver 135 can validate the timing of the bet. The prompt receiver 135 can facilitate the transmission of the wager to the service provider's backend, where the wager is logged and acted upon. The prompt receiver 135 can collect or store records of user prompts (and, in some implementations, conversation records including corresponding responses) in the storage 125 as part of one or more training examples 187 to improve the accuracy of the language model 195 to process and generate responses based on conditional intents over time, in some implementations.

In some implementations, the prompt receiver 135 can receive prompts for the language model 195 and parse them to extract relevant information. The prompt receiver 135 can identify and extract conditions specified within the prompt for further processing. For example, when the data processing system 105 receives a prompt such as "Give me a wager on the Thunderbolts for the playoffs if they win their next game", the prompt receiver 135 can identify the condition (e.g., Thunderbolts winning their next game, a future event) and parse the prompt accordingly. In another example, if the prompt is "Give me a wager on the Thunderbolts if they are playing tonight's game", the prompt receiver 135 can identify and process the condition related to the occurrence of a live event within a specific time period (e.g., Thunderbolts playing tonight, a scheduled event). The prompt receiver 135 can utilize predefined rule sets or custom algorithms to identify and process conditions within the prompt. In some implementations, the prompt receiver 135 can implement contextual analysis to accurately extract conditions based on the subject matter of the prompt. Once the condition is extracted, the prompt receiver 135 can execute specific actions, such as referencing the storage 125 or the data source 180 to monitor or evaluate the condition in real-time or for future events. The prompt receiver 135 can manage multiple prompts and address a wide variety of user queries. In some implementations, such approaches may be performed by the intent classifier 145 and/or other components of the data processing system 105.

The data processing system 105 can include the device communicator 140. The device communicator 140 can be or include any script, file, program, application, set of instructions, or computer-executable code that is configured to facilitate communication between the data processing system 105, the client system 115, and the machine learning system 120. The device communicator 140 can include hardware, software, or any combination. The device communicator 140 can facilitate communication between the data processing system 105, the network 110, the client system 115, and/or the machine learning system 120 via one or more communication interfaces. A communication interface can include, for example, an API compatible with components of the data processing system 105, the client system 115, or the machine learning system 120.

The device communicator 140 can support various communication protocols (TCP/IP, UDP) compatible with a particular component of the data processing system 105, a particular component of the client system 115, or a particular component of the machine learning system 120. The device communicator 140 can implement multiple communication interfaces, including web sockets or messaging protocols, to accommodate a range of client applications. The device communicator 140 can facilitate data transfer through techniques such as compression, encryption, and error correction, among others. The device communicator 140 can be compatible with diverse content items and can be compatible with particular content delivery systems corresponding to particular content items, structures of data, types of data, or any combination thereof. For example, the device communicator 140 can be compatible with the transmission of text data or binary data structured according to one or more metrics or data of the application interface 190 or the client system 115. The device communicator 140 can provide the client system 115 with instructions to display lists of interactive options, such as live events, content items, or wagering opportunities.

The data processing system 105 can include the intent classifier 145. The intent classifier 145 can be or include any script, file, program, application, set of instructions, or computer-executable code that is configured to determine the classification of the request included in a user input, referred to as a prompt. The intent classifier 145 can include hardware, software, or any combination. The intent classifier 145 can parse prompts received from the client system 115 to determine the intent of the user. In some implementations, the intent of the user can correspond to conditional intents related to wagering. For example, the intent classifier 145 can identify when a condition, such as "If the Thunderbolts win their next game", corresponds to a wagering-related intent. For a given prompt, the data processing system 105 can use the intent classifier 145 to generate an input context for the language model 195 using the prompt and its classification. The input context can include a variety of information, such as prompts, questions, or previous parts of a conversation, as well as conditional data and related metadata associated with one or more conditions in the prompt. The intent classifier 145 can identify the desired action or information sought by the user and generate an input context to include data related to that intent.

In some implementations, the intent classifier 145 can perform pattern recognition, conditional intent detection, or other data extraction techniques to identify one or more conditions in the prompt. In some implementations, the intent classifier 145 can use rule-based techniques to classify the intent of one or more prompts. For instance, a rule can specify that when a prompt includes a condition, such as "If the Thunderbolts win their next game" or "If the Thunderbolts are playing tonight's game", the intent classifier 145 can categorize the intent as wager-related, for example, corresponding to conditional betting. For example, a prompt like "Give me a wager on the Thunderbolts for their next game if they win tonight" or "Give me a wager on the Thunderbolts if they are playing tonight's game" can cause the intent classifier 145 to determine a wagering intent based on the specified condition. In some implementations, the intent classifier 145 can implement one or more machine-learning models, such as sparse vector machines (SVMs), naive bayes, or deep learning architectures such as recurrent neural networks (RNNs) and transformers (e.g., BERT) to automatically classify intents related to conditions within prompts and/or words/phrases thereof. The models can be trained on large datasets of user prompts and their corresponding conditional intents. The intent classifier 145 can use the machine learning model(s) to detect the presence of any conditions (e.g., conditions tied to specific teams, participants, outcomes, or other entities).

The intent classifier 145 can process user prompts to extract the underlying intent or purpose, for example, focusing on conditional intents. The intent classifier 145 can categorize the user's prompt into specific conditional intents, such as identifying a relevant wager opportunity if a certain condition is satisfied, checking odds based on a condition, or requesting information contingent upon a future event. The intent classifier 145 can determine the actions to satisfy the user's request based on the classified conditional intent. In some implementations, the intent classifier 145 can identify conditions within the prompt that correspond to the intent. For example, when the data processing system 105 receives a prompt, such as "Give me a wager on the Firebirds if they score the first touchdown", the intent classifier 145 can determine that the prompt includes a conditional wagering intent, identify the specific wager type, and extract relevant details such as the condition (e.g., Firebirds scoring the first touchdown) and the associated action (e.g., identifying a relevant wager opportunity). This may be performed using the language model 195, conditional intent detection models, and/or other techniques described herein.

In some implementations, the intent classifier 145 can identify the intent of the user based on the keywords in the prompt. For example, if the input prompt is "Give me a wager on the Thunderbolts if they are playing tonight's game", the keywords such as "wager", "Thunderbolts", and "playing tonight" are extracted by the intent classifier 145. Based on the classified keywords, the intent classifier 145 can generate an input context for the language model 195, which includes information about the keywords, the user's intent specified in the prompt, and any other relevant details. Based on the input context, the language model 195 can generate an output message that includes a command, function, or other type of indication that causes the data processing system 105 to reference the data source 180 and determine if the Thunderbolts are scheduled to play tonight (e.g., a schedule lookup command). If the condition is satisfied (e.g., the Thunderbolts are playing tonight), the data processing system 105 can identify relevant wager opportunities associated with the game based on the command.

In some implementations, the intent classifier 145 or the prompt receiver 135, depending on the implementation, can process user requests related to conditional payout information. For example, upon receiving a prompt about potential wager winnings based on a condition, such as "What will my payout be if the Thunderbolts win by more than 10 points?"

the intent classifier 145, via the data processing system 105, can cause the language model 195 to generate a data structure that includes the details of the potential payout based on the condition, wager's outcome, and associated odds. In some implementations, where the intent classifier 145 receives updates (e.g., updated odds for a condition-based wager), the intent classifier 145 can search through the existing wager data to find the corresponding wager based on identifiers (e.g., player ID, wager ID, or specific conditions).

The data processing system 105 can include the profile manager 150. The profile manager 150 can be or include any script, file, program, application, set of instructions, or computer-executable code that is configured to create, modify, delete, or otherwise manage player profiles 175 stored within the storage 125. The profile manager 150 can include hardware, software, or any combination. The profile manager 150 can store and organize player information, including account details, preferences, and gaming history, among others. The profile manager 150 can generate profile information based on data received from the client systems 115. This configuration can allow the profile manager 150 to capture activity across different interactive applications and different devices, and store records of that activity in the player profile 175. The profile manager 150 can update credit balances, game statistics, and other relevant information based on the outcomes of games played by the client system 115. The profile manager 150 can receive data about game results from the client system 115 and use this information to make adjustments to the player profile 175. The profile manager 150 can store game statistics such as the number of wins, losses, and ties, as well as the player's average bet size, win percentage, and longest winning streak, among others. In some implementations, the profile manager 150 can store records of player interactions, including prompts, responses, or conversation histories, with the language model 195.

In some implementations, the profile manager 150 can store conditional wager recommendations within the player profile 175. For example, the profile manager 150 can generate a data structure to store recommended wagers. The section can include details such as the wager ID, an identifier for each recommended wager, the specific condition that is to be satisfied for the wager to be placed, and the wager details, including the amount, odds, and event. The profile manager 150 can track the status of each wager, indicating whether it is pending, active, or completed. When a conditional wager recommendation is generated, the profile manager 150 can queue the recommendation in a queue of the player profile 175 until the condition is satisfied. For example, if a player requests, "Give me a wager on the Thunderbolts if they win their next game", the profile manager 150 can store the recommendation, and once the condition is satisfied (e.g., the Thunderbolts win their next game), the profile manager 150 can retrieve the recommended wager from the queue and add it to the player's bet slip. The profile manager 150 can update the status of the wager to indicate that it is active.

In some implementations, the profile manager 150 can dynamically update the player profile 175 to indicate wagers associated with wager opportunities as additional requests are received from the client devices 115 associated with the player profiles 175. The profile manager 150 can continuously track client devices 115 for incoming requests, processing each to determine the appropriate updates to the player profile 175. When a request is received, such as placing a wager or modifying a wager, the profile manager

150 can update the player profile 175 accordingly. The profile manager 150 can modify existing fields, such as adjusting the player's balance after a wager is placed, adding additional data related to the wager opportunity, or removing outdated information, such as wagers that are no longer relevant. For example, if a player submits a request to "Give me a wager on the Falcons to win their next game", the profile manager 150 can update the player profile 175 by adding wager details and adjusting the available credit balance. In another example, if the player later requests to modify or remove the wager, such as "Cancel my wager on the Falcons", the profile manager 150 can dynamically update the player profile 175 by removing the association between the wager and the player profile 175, adjusting the balance to indicate the cancellation, and updating the player profile 175 to indicate the removal of the wager opportunity.

The data processing system 105 can include the model updater 155. The model updater 155 may be implemented, for example, in implementations where the language model 195 (or adapters therefor, any other type of machine-learning model described herein, etc.) can be trained/fine-tuned/updated/modified by the data processing system 105. For example, in some implementations, the trainable parameters of the language model 195 may be executed by, maintained by, or otherwise accessible by the data processing system 105. In such implementations, the data processing system 105 may execute the model updater 155 to modify the trainable parameters of the language model 195 and/or generate one or more adapters for the language model 195 using one or more training datasets 185. In some implementations, the operations of the model updater 155 may be executed by, or executed in part by, the machine learning system 120. In such implementations, the data processing system 105 may transmit training examples 187 of one or more training datasets 185 to the machine learning system 120, and/or identify an accessible network location for the training examples 187 of one or more training datasets 185 to the machine-learning system 120 to perform the operations of the model updater 155.

The model updater 155 can train, fine-tune, update, re-train, or otherwise maintain one or more machine learning models (e.g., the language model 195, etc.). The model updater 155 can include hardware, software, or any combination thereof. The model updater 155 can use various machine learning algorithms, including supervised learning techniques, to train/fine-tune/update one or more machine-learning models (e.g., the language model 195) using labeled data (e.g., one or more training datasets 185) to improve their prediction accuracy, classification capabilities, command generation, or to align their output with particular styles, structured output formats, or other types of output related to conditions specified in the prompts, such as commands, functions, or instructions that are to be executed/interpreted/performed by the data processing system 105 to carry out any of the functionality described herein. In some implementations, the model updater 155 can implement unsupervised learning techniques, such as clustering and association rule mining, to identify patterns in unlabeled data related to conditional intents, and/or to generate labels for said unlabeled data. In some implementations, the model updater 155 can implement reinforcement learning techniques to update the language model 195 based on commands or outcomes associated with conditions or examples in one or more training datasets 185.

The model updater 155 can update one or more machine learning models, including but not limited to the language model 195 or adapters therefor, using one or more training datasets 185. As described herein, each training example 187 of the training dataset 185 can include an input prompt 188, indicating a conditional intent relating to wager opportunities or specifying a condition to be evaluated for a request, and a corresponding output message 189. The output message 189 can include structured data corresponding to one or more commands to cause the data processing system 105 to evaluate the respective condition based on the command and the request. The input prompt 188 can include data related to wager opportunities (e.g., search results, historical betting data, or player actions) and any other relevant information for evaluating a condition specified by the intent. The output message 189 can define one or more commands to evaluate the specified condition, such as monitoring the game's progress to determine if the Firebirds scored first or if the Thunderbolts are playing tonight's game, for example. The commands can be used to cause the data processing system 105 to evaluate whether the condition is satisfied and initiate an appropriate action, such as identifying a relevant wager opportunity associated with the event. The configuration and training of the language model 195 can include various training parameters, such as the learning rate, number of epochs, batch size, activation functions, and regularization techniques, to improve the ability of the language model 195 to process conditions specified in the prompts and generate accurate commands based on those conditions.

The model updater 155 can train/update/fine-tune the language model 195 or other machine learning components to generate structured data that identifies conditions in wager opportunities 170 and recommends actions based on the conditions, such as generating commands for the data processing system 105 to evaluate those conditions. For example, the model updater 155 can train the language model 195 using one or more training datasets 185 to handle prompts such as "Give me a wager on the Thunderbolts if they win the first half", generating commands to cause the data processing system 105 to monitor the live event 182 and evaluate whether the condition is satisfied before searching for a corresponding wager opportunity. The model updater 155 can implement various machine learning techniques, including supervised, unsupervised, and reinforcement learning, to continuously improve the performance of language model 195 in classifying intents corresponding to various conditions associated with wagering opportunities and generating accurate commands for the data processing system 105.

The model updater 155 can generate or otherwise include output messages 189 in the training dataset 185 based on information in corresponding historical input prompts 188, in some implementations. For example, the model updater 155 can parse an input prompt 188 using any intent classification techniques described herein to classify one or more conditions in the input prompt 188 and use the classification to generate a corresponding output message 189 to pair with the input prompt 188. The output message 189 can be generated to include one or more commands. The model updater 155 can classify conditions into different categories based on their characteristics or semantic meaning. During the process of generating training examples 187, the model updater 155 can select one or more commands that are most appropriate for evaluating the condition based on the classification. For example, the model updater 155 can identify which commands are commonly associated with each condition category by evaluating the patterns between conditions and the corresponding commands. In some implementations, the output messages 189 can be further generated by including corresponding command data in one or more predetermined template responses, which may include natural language output and one or more replaceable fields that are modified to include the identified command(s) to generate the training examples 187.

In some implementations, the model updater 155 can generate training examples 187 for inclusion in the training dataset 185 based on input prompts 188 that specify conditions related to future events. The model updater 155 can parse an input prompt 188 to classify one or more conditions, where the condition identifies the occurrence of an event, such as a team scoring first in a game. The model updater 155 can use the classification to generate a corresponding output message 189 that includes one or more commands to monitor the event and determine whether the condition is satisfied. For example, if the condition relates to a team scoring first, the output message 189 can include commands for the data processing system 105 to process the data associated with a live event and determine the score in real-time or near real-time. In some implementations, the model updater 155 can generate training examples 187 for inclusion in the training dataset 185 based on input prompts 188 that specify conditions corresponding to the occurrence of an event within a specific time period. For example, if the condition relates to whether a team is playing tonight, the output message 189 can include commands for the data processing system 105 to process the data associated with the team's schedule and determine in real-time or near real-time if the team has a game scheduled. The commands can cause the data processing system 105 to check the team's upcoming events and retrieve relevant information to determine if the team is participating in a game on the specified day. The model updater 155 can identify which commands can be associated with a condition category by evaluating patterns in the training data.

In some implementations, the model updater 155 can generate a training example 187 that specifies a plurality of commands for the respective output message 189 by evaluating historical or simulated data to identify complex conditions. For example, these conditions can include multiple factors, sequential actions, or conditional actions that depend on specific outcomes. The model updater 155 can identify cases where multiple commands are desired, such as when multiple factors or events are to be evaluated or when actions are to be performed in a particular order. The model updater 155 can generate output messages 189 that include multiple commands. The model updater 155 can separate and label each command to indicate its intended purpose. For example, an output message can include commands such as "Command 1: Monitor the home team's final score", "Command 2: If the home team scores more than 30 points, find a wager opportunity associated with the away team", and "Command 3: If the away team scores the next touchdown, find a wager opportunity associated with the home team". The model updater 155 can pair each input prompt 188 with its corresponding output message 189 to generate a training example 187.

In some implementations, the model updater 155 can generate an output message 189 that defines a command to update a list of conditions to monitor at periodic intervals. The command can cause the data processing system 105 to generate or access a list of conditions. The data processing system 105 can add the specified condition to the list and configure periodic monitoring of the conditions. In some implementations, the model updater 155 can generate an output message 189 for inclusion in the training example 187 that defines a command indicating a subsequent action to perform once the condition is satisfied. The subsequent action can include an operation to update a player profile with an indication of a wager opportunity. In some implementations, the command included in the output message 189 can cause the data processing system 105 to send a notification to the client device 115 for approval before placing a wager. In some implementations, the model updater 155 can generate an output message for inclusion in the training example 187, which includes a command or function that causes the data processing system 105 to perform an operation to update a player profile 175 with an indication of a wager opportunity. Any output messages 189 that are described herein as causing performance of or initiating action(s) of the data processing system 105 can include a corresponding indication of a command or function, as well as any corresponding parameters, to carry out those action(s).

In some implementations, the model updater 155 can provide instructions, training examples 187 (e.g., from the training dataset(s) 185, etc.) to the machine learning system 120, to cause the machine learning system 120 to train/fine-tune/update the language model(s) 195 according to the techniques described herein. In some implementations, training/updating/fine-tuning the language model 195 can involve periodic retraining using updated datasets, incorporating additional linguistic data, incorporating live event data, and refining model parameters based on performance metrics, among others. The model updater 155 can leverage feedback mechanisms and adaptive learning strategies such that the language models 195 are aligned with evolving language patterns relating to wager opportunities 160, live events 182 (or information associated therewith), and condition-based intents to accurately process conditional requests and generate commands to evaluate those conditions in real-time or near real-time.

In some implementations, the model updater 155 can use Low-Rank Adaptation (LoRA), Quantized Low-Rank Adaptation (QLoRA), or other adapters to train/update/fine-tune the language model 195. The model updater 155 can use LoRA to address the challenge of fine-tuning large models without updating all parameters. For example, instead of fine-tuning all the weights in the model, the model updater 155 can inject trainable low-rank matrices into each layer of the transformer architecture to reduce the number of trainable parameters or the computational load. In some implementations, the model updater 155 can extend LoRA by incorporating quantization techniques through QLoRA. For example, the model updater 155 can combine quantization with low-rank adaptation to reduce computational load. In some implementations, the model updater 155 can use prefix tuning, which adds trainable vectors to the input sequence to guide the model's attention. In some implementations, the model updater 155 can use p-tuning, which uses continuous prompts to fine-tune the model. In some implementations, the model updater 155 can use LongLoRA, a variant of LoRA, to manage longer sequences.

In some implementations, after the language model 195 has been trained with training examples 187 that include intents corresponding to different conditions (e.g., wager conditions, event-based triggers, scheduled-based events, etc.), the model updater 155 can store the set of training examples 187 in the training dataset 185. For example, if the language model 195 is trained to determine that the condition "if the Thunderbolts score first" or the condition "if the Thunderbolts are playing tonight" corresponds to a wager-related intent, the training examples 187, including these conditions, and the correct responses (e.g., checking the team's schedule or identifying wager opportunities) can be stored in the training dataset 185, such that the language model 195 can reference these examples for future improvements and updates.

The data processing system 105 can include the condition evaluator 160. The condition evaluator 160 can be or include any script, file, program, application, set of instructions, or computer-executable code that is configured to evaluate conditions provided in messages generated by the language model 195 and/or selected via the intent classifier 145. The condition evaluator 160 can collect real-time or near real-time data from various sources, such as IoT devices, data sources 180, databases, and external APIs, to evaluate conditions associated with live events 182 according to parameters specified in connection with the commands/functions, in some implementations.

In some implementations, the condition can indicate an outcome for a future event. The condition can specify a desired outcome or result, such as "If Team A wins the next game" or "If Team B's score exceeds 100 points". In some implementations, the condition can correspond to the occurrence of a live event 182 within a specific time period. For example, the condition can specify "If Team A is playing tonight" or "If a specific player is playing during a specific time period". In some implementations, the outcome-based conditions or the time-based conditions can cause the condition evaluator 160 to track wager opportunities based on live event data. It should be understood that these are various example conditions, and that any type of natural language condition can be included in an prompt received from a client system 115.

The condition evaluator 160 can evaluate conditions that are classified from the input prompts. In one example, the language model 195 can be trained/updated to specify a corresponding command/function to evaluate the condition specified in an input prompt. In another example, the intent classifier 145 can classify the condition using the intent classification techniques described herein, and can select a corresponding command/function to execute to evaluate the condition. In another example, a condition may be a future condition that cannot currently be evaluated, but live events 182 or other occurrences can be monitored at a future time to evaluate the conditions described herein. In such implementations, indications of conditions to monitor may be stored in association with the player profile 175 that was used to provide the corresponding input prompts.

In some implementations, the condition evaluator 160 can determine that a condition is satisfied based on information retrieved from a data source 180 identified by the command generated by the language model 195. The data source 180 can be any repository of relevant data, such as live event scores or player statistics, that can be used to evaluate the condition. The language model 195 can generate a command that specifies the condition to be evaluated, such as "If the Thunderbolts score more than 30 points, give me a wager" or "if the Thunderbolts is playing tonight, give me a wager". The condition evaluator 160 can identify the most relevant data source for the condition, based on factors such as the type of event or time period. The condition evaluator 160 can retrieve the data, for example, by accessing the data source 180, including data associated with live events 182. The condition evaluator 160 can compare the retrieved data, such as the Thunderbolts' current score or the game status, to the specified condition. If the score exceeds 30 points or if the specified team is playing, the conditional evaluator 160 can determine that the condition has been satisfied.

In some implementations, the condition evaluator 160 can determine that the condition corresponding to a future event has been satisfied. The condition evaluator 160 can monitor future events through various techniques, such as receiving real-time or near real-time data feeds from data sources 180, performing scheduled checks at predefined intervals, or using external APIs to obtain event data. For example, if the condition is "If the Thunderbolts win their next game, place a bet on the Thunderbolts' third game", the condition evaluator 160 can monitor the Thunderbolts' upcoming game. Once the game concludes, the condition evaluator 160 can compare the Thunderbolts' final score with the opposing team's score to determine whether the condition, such as winning the game, has been satisfied. If the Thunderbolts win, the condition evaluator 160 can determine that the condition has been satisfied.

In some implementations, once the condition is satisfied, the condition evaluator 160 can identify a relevant wager opportunity based on factors, such as odds, potential payout, and the user's preferences. The condition evaluator 160 can trigger an action within the data processing system 105, such as causing the data processing system 105 to execute the identified wager opportunity, send the recommendation to the client device 115, or trigger additional processes such as updating the player profile 175. For example, when the condition evaluator 160 determines that a specific condition has been satisfied (such as "If the Thunderbolts win their next game" or "If the Thunderbolts are playing tonight"), the condition evaluator 160 can cause the data processing system 105 to update the player profile 175 associated with the client device 115. For instance, based on the wager opportunity associated with the satisfied condition, the data processing system 105 can add a wager to the player profile 175.

In some implementations, the condition evaluator 160 can determine that a condition is satisfied upon a change in the status of a future event. For example, the evaluator can track for score updates, time elapsed, or other relevant factors depending on the specific condition. Once a change in the event status occurs, the condition evaluator 160 can evaluate whether the updated status satisfies the specified condition. For example, if the condition is "If Team A takes the lead in the second half, give me a wager", the condition evaluator 160 can monitor the event and detect when Team A takes the lead. Upon detecting the status change, the condition evaluator 160 can determine that the condition is satisfied, triggering the appropriate action, such as identifying relevant wager opportunities associated with the event.

In some implementations, the condition evaluator 160 can receive a message from an external computing system identifying the status of a live event 182 and can determine that the condition is satisfied based on the message. For example, as described herein, the condition evaluator 160 can determine whether the conditions specified in the prompt are satisfied by receiving real-time data or updates from external systems, such as data sources 180. Upon receiving a message, the condition evaluator 160 can extract relevant data, such as the current score, time remaining, or other metrics, and compare the extracted data to the condition specified in the prompt. For example, if the external system is a sports data provider and the condition is "If the Thunderbolts are leading by 10 points with 5 minutes left, give me a wager", the condition evaluator 160 can receive a message including the current score and time remaining. The evaluator can then extract this information, compare it to the specified condition, and if the Thunderbolts are leading by 10 points with 5 minutes left, the condition is satisfied, causing the data processing system 105 to identify a relevant wager opportunity. In some implementations, the condition evaluator 160 can maintain a state of one or more live events 182 that are being monitored and update this state continuously as additional messages are received from external computing systems. The condition evaluator 160 can evaluate the condition against the updated state to determine if the condition has been satisfied.

In some implementations, the condition evaluator 160 can identify a second condition corresponding to a second future event and can receive, prior to determining that the condition is satisfied, a second request to remove the association between the second wager opportunity and the condition in the player profile 175. The condition evaluator 160 can cause the profile manager 150 to update the player profile 175. The profile manager 150 can identify the specific wager opportunity associated with the player profile 175 and removing the reference to the condition. The profile manager 150 can update the status of the wager accordingly. For example, the condition evaluator 160 can identify a second condition associated with a future event, such as "If the Thunderbolts win their next game". If the player requests to remove this association before the condition is satisfied, the condition evaluator 160 can cause the profile manager 150 to update the player profile 175 by removing the condition from the wager entry and adjusting the wager status.

In some implementations, the condition evaluator 160 can identify a second condition generated based on a second prompt and can determine that the second condition is not satisfied. The condition evaluator 160 can cause the data processing system 105 to transmit a notification to the client device 115, indicating that the second condition is not satisfied and that the second wager opportunity may not be executed. For example, if the initial condition is "If the Thunderbolts score more than 30 points, give me a wager", and the second condition, generated based on the user's request, is "If the Firebirds score a touchdown in the next drive, cancel the previous wager request," the condition evaluator 160 can evaluate both conditions. The condition evaluator 160 can determine that the Thunderbolts scored more than 30 points, satisfying the initial condition. However, if the Firebirds do not score a touchdown in the next drive, the condition evaluator 160 can determine that the second condition is not satisfied. The condition evaluator 160 can send a notification to the client device 115, indicating that the second condition is not satisfied, and therefore, maintaining the wager opportunity associated with the first request.

In some implementations, the condition evaluator 160 can determine that a second condition corresponding to a second future event cannot be satisfied and can cause the data processing system 105 to transmit a notification to the client device 115 indicating that the second condition cannot be satisfied. In some implementations, the condition evaluator 160 can evaluate whether the second condition can be satisfied based on the available information and the current state of the live event 182. If the condition evaluator 160 determines that the condition is impossible to satisfy, such as due to game rules, the condition evaluator 160 can determine that the condition cannot be satisfied. For example, if the second condition is "If the Thunderbolts score 50 points in the first ten minutes of the game, place a wager", the condition evaluator 160 can determine that it may be impossible for a team to score 50 points in the first ten minutes of the game based on the current state of the game or rules. The condition evaluator 160 can cause the data processing system 105 to send a notification to the client device 115, indicating that the second condition is not satisfiable, and the associated wager opportunity may not be executed.

The data processing system 105 can include the notification sender 165. The notification sender 165 can be or include any script, file, program, application, set of instructions, or computer-executable code that is configured to send notifications to client devices 115 based on the evaluation of conditions. The notification sender 165 can transmit notifications to notify users about the satisfaction or non-satisfaction of conditions related to wagers, updates on live events 182, or other relevant information. For example, the notification sender 165 can notify a user when a condition (e.g., a future condition that was enqueued for monitoring/evaluation) has been satisfied and can present the associated relevant wager opportunity, or notify a user when a condition cannot be satisfied and the associated wager opportunity cannot be executed.

In some implementations, the notification sender 165 can determine the client device 115 that is to receive a notification via the player profile 175 associated with the client device 115. The player profile 175 can indicate user preferences, wager associations, and other relevant criteria, which the notification sender 165 can use to select the correct client devices 115 for notification. In some implementations, the notification sender 165 can transmit push notifications to the client device 115 via APIs, email notifications to the user's registered email address, or in-app messages displayed within the application interface 190. In some implementations, the notification sender 165 can format the messages based on the user's preferences or the specific context of the notification.

In some implementations, the notification sender 165 can transmit messages that include information about the live event 182, the status of the condition, and any relevant actions or recommendations. The notification can be sent to the client device 115 once the condition is satisfied, providing the user with a wager recommendation identified based on the original prompt. For example, when the condition associated with a wager opportunity is satisfied, the notification sender 165 can transmit a notification to the client device 115 associated with the player profile 175. The notification can include details about the live event 182, the condition status (e.g., "The Thunderbolts won the game" of "The Thunderbolts are playing tonight's game), and a wager recommendation (e.g., "Place a $50 bet on the Thunderbolts"). The user via the client device 151 can confirm the wager recommendation directly within the notification, and upon confirmation, the wager can be automatically added to the bet slip for execution.

The client system 115 can execute an application that communicates with the data processing system 105. The application can present one or more application interfaces 190. The application interface 190 can include a set of rules or protocols that allow different software programs or systems to communicate with each other. The application interface 190 can provide user interfaces to facilitate interaction. Users can input information, view content, or initiate actions through the application interface 190. In some implementations, the application interface 190 can be associated with a particular client application that communicates with the data processing system 105 to process user prompts that correspond to conditions or intents related to wagers, players, or teams.

The client application can include an application executing on each client system 115. The client application can include a web application, a server application, a resource, a desktop, or a file. In some implementations, the client application can include a local application (e.g., local to a client system 115), a hosted application, a software-as-a-service (SaaS) application, a virtual application, a mobile application, and other forms of content. In some implementations, the client application can include or correspond to applications provided by remote servers or third-party servers. In some implementations, the client application can process user prompts associated with wagers, conditions, or specific sports-related entities.

The application interface 190 can include graphical user interfaces or graphical elements that present content items, interaction modes, or wager recommendations. The application interface 190 can dynamically configure the graphical user interface based on the user's activities, preferences, or the identification of conditions or intents used during interactions (e.g., conditions related to wagers or team performance). The application interface 190 can receive interactions from the user, such as selections or specifications of wagers to be placed through the application interface 190. In response to receiving the interactions, the client application presenting the application interface 190 can communicate with the data processing system 105 to execute the placement of wagers. In some implementations, the application interface 190, via the client system 115, can cause the data processing system 105 to update the storage 125 to include the details of the wager counts. In some implementations, upon interaction with a graphical element, the application interface 190, via the data processing system 105, can cause the profile manager 150 to update a player profile 175 associated with the client system 115 according to the wager placed.

The client communicator 192 within the client system 115 can be similar to, and include any of the structure and functionality of, the device communicator 140 described in connection with the data processing system 105. For example, the client communicator 192 within the client system 115 can communicate with the data processing system 105 via the network 110 using one or more communication interfaces to carry out the various operations described herein. The client communicator 192 can be compatible with particular content objects and can be compatible with particular content delivery systems corresponding to particular content objects, structures of data, types of data, or any combination thereof.

The machine learning system 120 can include the language model 195. The language model 195 can be trained on text data. For instance, the language models 195 can be trained/updated/fine-tuned to perform a variety of text processing tasks, including, but not limited to, generating text, generating commands to evaluate conditions, comprehending and processing natural language input that includes intents corresponding to conditions, and responding to queries with contextually relevant information, such as commands or actions. The language model 195 can include a transformer architecture, such as a generative pre-trained transformer (GPT) architecture. The transformer architecture can include an encoder that can process the input text and a decoder that can generate the output text. The language model 195 can include multiple layers that can operate to process and generate text. For example, embedding layers can convert words or tokens into dense vectors of fixed size, attention layers can use mechanisms such as self-attention to weigh the importance of different tokens in a sequence, and feedforward layers can apply transformations to the data to learn complex patterns. In some implementations, the language model 195 can use a self-attention mechanism to weight different parts of the input sequence when generating predictions. The language model 195 can be trained/fine-tuned/updated on vast datasets (e.g., one or more training datasets 185, etc.), for example, generated or updated by the model updater 155 using different learning techniques, as described herein. The language model 195 may be pre-trained using large corpuses of natural language text data, such that the language model 195 can efficiently process and provide output corresponding to natural language input.

Natural language input can have a syntactic structure in which individual words, collections of words (e.g., phrases), or relative positions of words (e.g., word order) can indicate specific meanings. The language model 195 can be trained/updated/fine-tuned to parse sentences into their grammatical components to understand the structure and relationships between words. The language model 195 can use phrasing structure rules that define how words combine to form phrases and sentences. The language model 195 can receive an input context, which can include a sequence of tokens and/or text data structured in a format compatible with an input layer of the language model 195. In some implementations, the language model 195 may include or may be associated with a tokenizer model, which can convert a text-based or media-based input context into a sequence of tokens compatible with an input layer of the language model 195. The input context may include natural language, structured data, or combinations thereof, and may specify instructions for the model to generate particular output (e.g., commands or actions corresponding to conditional intents, etc.) according to the techniques described herein.

The language model 195 can receive an input context generated via the intent classifier 145. As described herein, the input context can include the user's prompt, the classification of the intent, relevant keywords associated with live events 182 identified based on the prompt, and additional instructions to evaluate conditions and validate time periods for wagers. These additional instructions can function as a template or system prompt, guiding the language model on how to generate commands tied to specific conditions. The data processing system 105 can transmit the input context to the language model 195. The machine learning system 120 can execute the language model 195 to process the input context. The language model 195 can generate an output data structure including one or more tokens representing an output message generated based on the input context. In some implementations, tokens or combinations of tokens can indicate special control data for the language model, including but not limited to the beginning/end of prompts, natural language text, the evaluation of conditions, the generation of commands based on the conditions, the identification of wager opportunities 170 associated with events, or any other type of data described herein. In some implementations, based on the prompt or player intent, the language model 195 can receive input contexts from the data processing system 105 in various formats, such as text, JSON, or structured data. The language model 195 can process the input context to determine a desired output or action, such as generating a command to evaluate a condition included in the prompt.

The language model 195 can process a wide range of input formats, including but not limited to text, audio, images, video, or other modalities. In some implementations, based on the input context, the language model 195 can generate output, which can range from simple text responses to complex data structures (e.g., generating commands), or combinations thereof. In some implementations, the language model 195 can use the input context to iteratively predict the next token word or phrase to generate responses in response to input contexts. Tokens may include a numerical representation of text data, function calls, special separators/control signals, or any other data described herein. In some implementations, the language model 195 can generate instructions or commands that automatically invoke tools or functions to perform specific tasks or operations, such as evaluating conditions or retrieving relevant data.

In some implementations, the language model 195 can generate a data structure and/or formatting instructions that define the visual attributes of graphical elements. The data structure can include details such as text content, layout specifications, visual or graphical elements, and other interactive components. In some implementations, the language model 195 can generate a data structure, including details or instructions for generating a graphical element that displays wager recommendations or other relevant information. In another example, the language model 195 can generate a data structure having instructions to present statistics or details relating to one or more live events 182. Such data structures can include details such as chart type, data points (e.g., team names, odds), axes labels (e.g., teams, scores, etc.), and formatting details (colors, fonts, sizes), which can be used to visualize real-time data or near real-time data from live events 182. The data structure can be parsed by the client system 115 to generate the visual representation of graphical elements. In some implementations, the language model 195 can generate data structures that include instructions for generating interactive elements such as hover effects, tooltips, or clickable regions. In some implementations, the language model 195 can adapt the generated data structure to accommodate specific player preferences for the visual representation.

In some implementations, the language model 190 can generate a data structure defining a graphical element, including properties such as type (button, menu, image), content, layout, and interactive behaviors, among others. In some implementations, the data structure can include metadata specifying the target application interface 190 to be navigated to upon interaction with the graphical element. The client system 115 can parse the received data structure and present the corresponding graphical element via the application interface 190. In some implementations, where a player interacts with the graphical element, for example, representing a wager recommendation, the data processing system 105 can update the associated player profile accordingly.

In some implementations, the language model 195 can generate a command for the data processing system 105 to evaluate the condition included in the prompt. For example, the language model 195 can generate an output message that includes a command for the data processing system 105 to monitor the specified condition and select a wager opportunity associated with a live event 182 based on the prompt. The language model 195 can process the prompt to determine the user's intent corresponding to the specified condition and can generate an output message including the command. In some implementations, the output message can cause the data processing system 105 to monitor the condition, such as tracking the outcome of a specific game or event.

Once it is determined that the condition has been satisfied, the data processing system 105 can identify the associated wager opportunity. For example, given the input prompt, "If the Thunderbolts win tonight's game, give me a wager on the Thunderbolts for their next game", the language model 195 can generate "Command 1: Monitor the Thunderbolts' game tonight", and "Command 2: If the Thunderbolts win, provide a relevant wager opportunity associated with their next game". The commands can cause the data processing system 105 to monitor the condition and identify a relevant wager opportunity when the condition is satisfied. In another example, if the given input prompt is, "If the Thunderbolts are playing tonight's game, give me a wager on the Thunderbolts", the language model 195 can generate "Command 1: Determine if the Thunderbolts are scheduled to play tonight", and "Command 2: If the Thunderbolts are playing tonight, provide a relevant wager opportunity associated with the game". The commands can cause the data processing system 105 to query the data source 180, determine whether the Thunderbolts are playing, and, if the condition is satisfied, identify relevant wager opportunities associated with the game. In some implementations, the language model 195 can generate a command to cause the data processing system 105 to update the player profile 175 to include the relevant wager opportunity.

In some implementations, the language model 195 can generate data structures corresponding to wager details associated with a live event 182, such as the wager type (e.g., moneyline, point spread, parlay) and relevant details, such as teams, odds, and bet amounts. In some implementations, the language model 195 can generate an additional data structure or update an existing data structure in response to receiving an input context that includes updated information, such as new odds for a specific wager. The data structure can include a timestamp indicating when the update occurred and a list of changes. For example, each change can specify the field that was modified. The language model 195 can transmit the updated data structure, including the updated wager data, to the client system 115 via the data processing system 105.

In some implementations, where the client system 115 is associated with a player profile 175, the data structure generated by the language model 195 can include instructions to generate an interactive element that, when interacted with, can cause the client system 115 to transmit a request to the profile manager 150 to update the player profile 175 based on, for example, wager recommendations. In some implementations, the language model 195 can process input contexts for payout information. For example, upon receiving an input context about wager winnings, the language model 195 can generate a data structure, including the details of the potential payout based on the wager's outcome and odds. The client system 115 can parse the data structure and present the information along with any relevant details via the application interface 190.

In some implementations, the data processing system 105 can execute the language model 195 as a component. In some implementations, the data processing system 105 can select one of a set of language models 195 to use in connection with the techniques described herein based on different factors, including but not limited to computational complexity, efficiency, and task-specific capabilities, among other attributes. The data processing system 105 can use data cleansing, model-specific tokenization, or other standardization techniques to maintain compatibility with the language model 195. In some implementations, the data processing system 105 can implement batch processing, data streaming, or asynchronous data management techniques to manage data flow into the language model 195. In some implementations, where the data processing system 105 is using an API to access the functionality of the language model 195, the data processing system 105 can integrate API calls into its operational workflow to carry out any tasks described herein. In some implementations, where the data processing system 105 is deploying the language model 195 on local infrastructure, the data processing system 105 can load the language model 195 into system memory. The data processing system 105 can format incoming data to match the input structure of the language model 195.

B. Systems and Methods for Generating Instructions for Network Optimization Using Language Models Referring now to FIG. 2, depicted is an illustrative flow diagram of a method 200 for generating instructions for network optimization using language models. The method 200 can be executed, performed, or otherwise carried out by a server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 200, the server or the system can maintain a plurality of wager opportunities corresponding to a plurality of live events (STEP 202), receive a prompt including a condition and a request for a wager recommendation (STEP 204), generate, using a language model and the prompt, a command to evaluate the condition included in the prompt (STEP 206), determine that the condition is satisfied (STEP 208), transmit a notification to a client device responsive to determining that the condition is not satisfied (STEP 210) or identify a wager opportunity based on the prompt responsive to determining that the condition is satisfied (STEP 212), and provide an output message identifying the wager opportunity (STEP 214).

In further detail of method 200, the data processing system can maintain a plurality of wager opportunities corresponding to a plurality of live events (STEP 202). Each wager opportunity can correspond to a predefined wager type. The data processing system can generate and manage a collection of wager opportunities. The wager opportunities can be directly associated with live events. Examples of wager opportunities can include Team A to win the game, Team B to win the game, total points scored over/under X points, Team A to win by X or more points, and Player C to score over X points, among others. Any type of wager opportunity can be maintained by the data processing system, which may involve storing and/or updating wager opportunities (or the odds thereof) in response to detected changes in one or more live events to which they correspond.

The data processing system can receive a prompt including a condition and a request for a wager recommendation (STEP 204). The condition within the prompt can be related to the occurrence of a live event within a specified time period. For example, the prompt can request a wager recommendation based on whether a specific team is participating in a game that day. In some implementations, upon receiving the prompt, the data processing system can extract keyword(s) from the prompt, such as a team's name, event type, time period, specified conditions, or other metrics. In some implementations, the data processing system can process additional prompts, including varying conditions for other wager opportunities, allowing the data processing system to manage multiple wager opportunities based on various conditions specified in incoming prompts.

The data processing system can generate, using a language model and the prompt, a command to evaluate the condition included in the prompt (STEP 206). The data processing system can generate an input context for the language model based on the prompt and keyword(s) that correspond to the user's intent. The language model can process the input context (e.g., generated using the intent classifier 145, etc.) and generate a command for the data processing system to evaluate the condition specified in the prompt. For example, if the input prompt is "Give me a wager on the Thunderbolts if they are playing tonight's game", the input context may include information such as the team's name "Thunderbolts", the time frame "Tonight (current day)", and the event type "game". Based on the input context, the language model can then generate an output message with command(s) for the data processing system to evaluate whether the specified condition is satisfied.

The output message can include the commands to identify the event associated with the specified condition. For example, the output message can include "Command 1: Check if the Thunderbolts have a game scheduled for tonight" and "Command 2: If the Thunderbolts are playing, identify relevant wager opportunities based on the game (e.g., moneyline, point spread, total points)". The format of various example commands provided herein are represented as natural language strings for clarity, but it should be understood that any type of command may be provided in the output message, including but not limited to structured output, encoded indications, and/or specialized tokens, as described herein. In this example, the first command causes the data processing system to identify the associated live event from the data source. For instance, the data processing system can reference a storage or data source that includes information about the corresponding live events. In some implementations, the data processing system can use stored schedules or real-time feeds to identify the corresponding live event. The second command causes the data processing system to determine the potential wager opportunities based on the game and the user's preference once the condition associated with the event is satisfied.

The data processing system can determine that the condition is satisfied (STEP 208). In some implementations, the data processing system can determine that the condition is satisfied based on information retrieved from a data source identified by the command. As described herein, the language model can generate a command that specifies the condition to be evaluated. The data processing system can identify the data source to evaluate the condition, based on factors such as the event type, location, or time period, among others. Once the relevant data source is identified, the data processing system, via the condition evaluator, can retrieve the data from the data source and compare the data to the condition specified in the prompt. For example, if the condition is "If Joel Pascal is playing tonight, give me a wager", the data processing system can identify a live sports schedule database as the relevant data source. The data processing system can access the schedule information from the database to determine whether Joel Pascal is scheduled to play. If the data processing system detects that Joel Pascal is playing, the data processing system can determine that the condition is satisfied and search for relevant wager opportunities. In some implementations, the data processing system can continuously monitor relevant live events, tracking them against the defined time period specified in the prompt. In some implementations, the data processing system can determine whether any of the tracked events take place within the specified time frame. If an event occurs as specified in the condition, the data processing system can determine that the condition is satisfied.

In some implementations, the data processing system can receive a message from an external computing system that identifies the status of a live event and determine whether the condition is satisfied based on the message. The message can include relevant details such as whether a specific team or player is participating, the scheduled time of the event (e.g., tonight), the event location, or other relevant factors such as roster changes or game status. The data processing system can extract the data from the message and compare it to the condition specified in the prompt. If the condition aligns with the provided information, the data processing system can determine that the condition is satisfied. In some implementations, the data processing system can receive subsequent messages corresponding to updated conditions related to other wager opportunities.

The data processing system can transmit a notification to a client device responsive to determining that the condition is not satisfied (STEP 210). For example, if the condition "If the Thunderbolts are playing tonight" is not satisfied, the data processing system can transmit a notification to the client device indicating that the condition is not satisfied, and the wager opportunity may not be executed. The notification can include details about the condition that is not satisfied and the related outcome, which is the cancellation of the wager opportunity.

The data processing system can identify a wager opportunity based on the prompt responsive to determining that the condition is satisfied (STEP 212). For example, if the condition "If Thunderbolts is playing, give me a wager" is satisfied, the data processing system can evaluate the available data and search for relevant wagering opportunities. Upon determining that Thunderbolts is playing, the data processing system can evaluate different potential wager opportunities, such as placing a wager on Thunderbolts to win or on the total score of the game. In some implementations, the data processing system can take into account the user's preferences, betting history, and the odds for various outcomes, such that the identified wager opportunity corresponds to the user's request and the overall context of the prompt. In some implementations, the data processing system can update the player profile to indicate the wager associated with a wager opportunity. In some implementations, the data processing system can update the player profile in response to receiving a request from the client device. For example, the client system associated with the client device can generate a request upon an interaction with a graphical user interface on the client device.

The data processing system can provide an output message identifying the wager opportunity (STEP 214). In some implementations, the data processing system can generate an output message identifying a relevant wager opportunity associated with a live event. For example, after identifying a wager opportunity based on the satisfied condition and the user's request, the data processing system can generate, via a language model, an output message. The data processing system can transmit the output message to the client device, such as "The Thunderbolts are scheduled to play tonight. Here is your selection for tonight's game". In some implementations, the message can include details about the wager, such as the amount, odds, and potential payout, as well as information about the associated live event. In some implementations, the data processing system can automatically execute the most relevant wager opportunity based on the user's preferences and the satisfied condition. In some implementations, the data processing system can add the identified wager opportunity to a bet slip associated with the player profile. After receiving confirmation from the client device, the data processing system can execute the corresponding wager opportunity.

Figure 3:
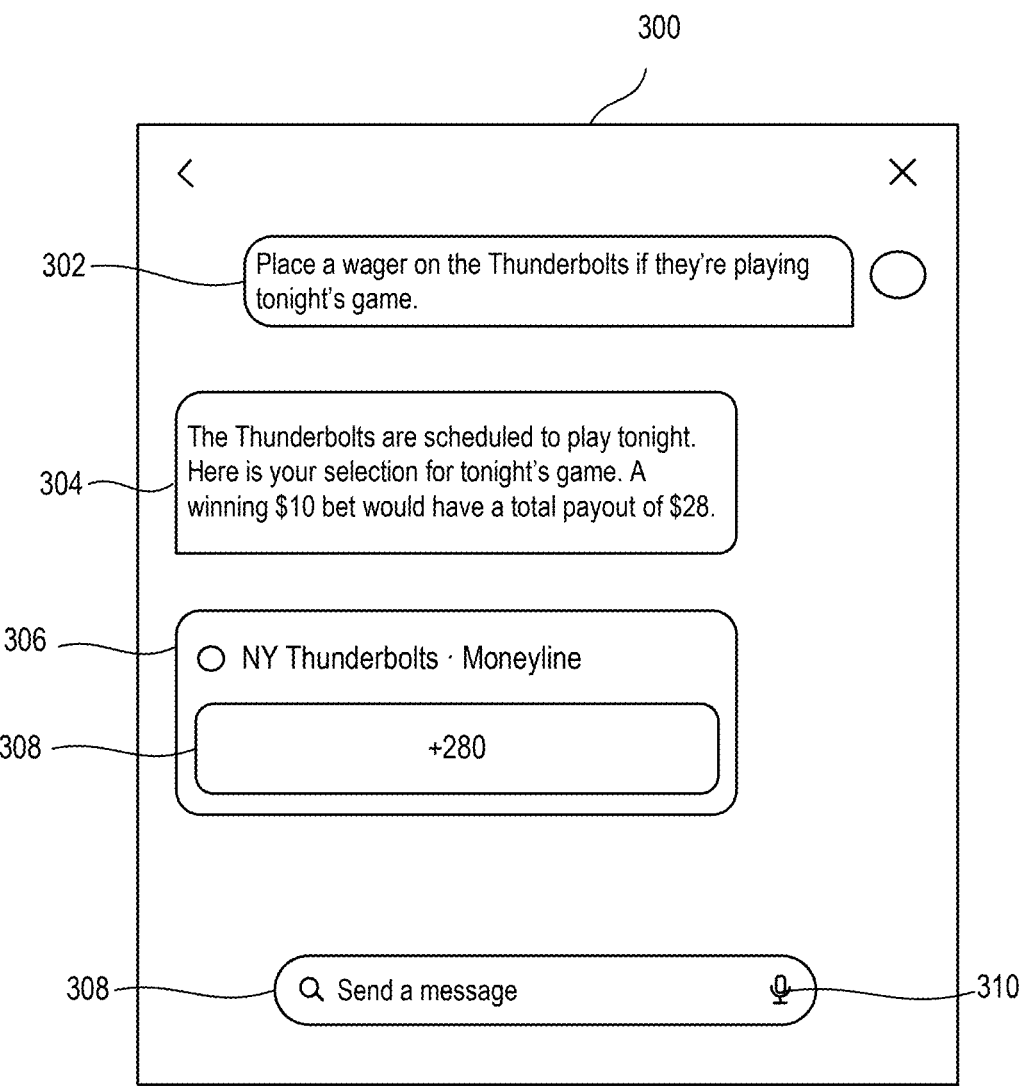
FIG. 3 illustrates an example implementation of an application interface in connection with FIG. 2, in accordance with one or more implementations.

Referring now to FIG. 3, depicted is an example implementation of an application interface, as described in connection with FIG. 2. As shown, a graphical user interface 300 can display a prompt 302 based on a player's interaction with a message bar 308. The prompt 302 can be an initial prompt or search term entered by the player via the message bar 308. The message bar 308 can be used to input text or initiate voice commands for sending prompts 302. For example, players can type their message directly into the designated text box within the message bar 308, or they can use a microphone icon 310 to dictate their prompts. In this example, the prompt 302 reads "Place a wager on the Thunderbolts if they're playing tonight's game", indicating a request for a wager opportunity contingent upon whether the Thunderbolts are scheduled to play that evening.

The data processing system 105 can receive text data entered into the prompt 302 as input from the client system 115 over the network 110. Upon receiving the prompt, the data processing system 105 can determine the classification of the intent behind the request based on keywords, such as "wager", "Thunderbolts", and "game tonight". The data processing system 105 can generate an input context for the language model 195 based on the classified prompt, which may include details such as the specific team (e.g., Thunderbolts) and the type of event (e.g., game) being queried.

The language model 195 can process the input context, which can include the prompt, identified team, event type, and relevant conditions, to generate a command for the data processing system 105. For example, the command generated by the language model 195 can cause the data processing system to retrieve data from an external data source, such as a live event feed, and determine whether Thunderbolts are scheduled to play tonight. If the data processing system 105 identifies that Thunderbolts are scheduled to play tonight, the data processing system 105 can update the input context for the language model 195 to indicate that the condition has been satisfied and provide relevant wager opportunities associated with the event.

The language model 195 can process the input context (which can include the prompt, identified wager opportunity data, and other relevant data) to generate a data structure corresponding to one or more wager opportunities associated with the event. For example, the data structure can include information such as the wager type, participants, and relevant metrics, among others. The client system 115 can parse the data structure to display an output message 304 via the graphical user interface 300, such as "The Thunderbolts are scheduled to play tonight. Here is your selection for tonight's game. A winning $10 bet would have a total payout of $38". The graphical user interface 300 can also display the wager option 306 and odds 308 associated with the generated wager option 306. The odds 308 can indicate betting dynamics. For example, positive odds, such as +280, indicate that a $10 wager at +280 odds will result in a total payout of $38, including a $28 profit.

C. Systems and Methods for Generating Instructions for Future Network Optimization Using Language Models Referring now to FIG. 4, depicted is an illustrative flow diagram of a method 400 for generating instructions for future network optimization using language models. The method 400 can be executed, performed, or otherwise carried out by a server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 400, the server or the system can maintain a plurality of wager opportunities corresponding to a plurality of live events (STEP 402), receive a prompt including a condition corresponding to a future event and a request for a wager recommendation (STEP 404), generate, using a language model and the prompt, output including a command to monitor the condition and a wager opportunity (STEP 406), determine that the condition corresponding to the future event is satisfied (STEP 408), transmit a notification to a client device responsive to determining that the condition is not satisfied (STEP 410) or update a player profile responsive to determining that the condition is satisfied (STEP 412), and provide an indication to a client device (STEP 414).

In further detail of method 400, the data processing system can maintain a plurality of wager opportunities corresponding to a plurality of live events (STEP 402). Each wager opportunity can correspond to a predefined wager type. The data processing system can generate and manage a collection of wager opportunities. The wager opportunities can be directly tied to live events. Examples of wager opportunities can include Team A to win the game, Team B to win the game, total points scored over/under X points, Team A to win by X or more points, and Player C to score over X points, among others. Any type of wager opportunity can be maintained by the data processing system, which may involve storing and/or updating wager opportunities (or the odds thereof) in response to detected changes in one or more live events to which they correspond.

The data processing system can receive a prompt including a condition corresponding to a future event and a request for a wager recommendation (STEP 404). The condition can indicate a specific outcome associated with an event that has not yet occurred. The condition can refer to a future event with an unknown outcome. For example, the prompt could state, "If Team A wins tomorrow's game, give me a wager on Team A for their next game". In some implementations, upon receiving the prompt, the data processing system can extract keyword(s) from the prompt, such as a team's name, event type, time period, specified conditions, or other metrics. In this example, the data processing system identifies the team "Team A", the event type "tomorrow's game", and the relevant condition "whether Team A wins".

In some implementations, the data processing system can receive a prompt from a client device associated with a player profile. The player profile can include relevant information, including preferences, betting history, and other data. Upon receiving the prompt, such as "Give me a wager on the Falcons for their next game", the data processing system can identify the associated player profile, and based on the user's preferences or wagering history, the data processing system can identify a corresponding wager opportunity, such as wagering on the Falcons' upcoming match.

The data processing system can generate, using a language model and the prompt, output including a command to monitor the condition and a wager opportunity (STEP 406). The language model can generate an output message for the data processing system that identifies a future live event and the corresponding condition. For instance, the language model can process the input context of the prompt to identify the condition associated with the future event and generate a corresponding command for the data processing system to evaluate the condition. For example, if the prompt is "If the Thunderbolts score in the first quarter of their next game, give me a wager on the Thunderbolts", the language model can generate a command to cause the data processing system to monitor the Thunderbolts' future game and determine whether they score in the first quarter. In some implementations, the command generated by the language model can include instructions specifying how frequently the data processing system is to monitor the status of the game (e.g., every minute) and the data source from which to retrieve real-time updates.

In some implementations, based on the command, the data processing system can reference a storage or data source that stores the corresponding live events. For instance, the data processing system can reference a database with the corresponding game schedules and identify the corresponding live event. In some implementations, the data processing system can use stored schedules or real-time feeds to identify the corresponding live event. In some implementations, the data processing system can receive a message from an external computing system that identifies a change in the status of the future event. The data processing system can identify the live event being referenced and extract the updated status, such as the current score, remaining time, or other relevant metrics. For example, the data processing system can receive a message from a sports data provider indicating the updated score of a game between Team A and Team B. The data processing system can identify the event as the ongoing game and extract the updated score from the message to update the wager opportunity or other relevant actions.

The data processing system can determine that the condition corresponding to the future event is satisfied (STEP 408). The data processing system can monitor a future event to monitor its progress and outcome and determine whether the condition specified in the prompt is satisfied. For example, if the condition is "If the Thunderbolts win tomorrow's game, give me a wager on the Thunderbolts for their next game", the data processing system can continuously monitor the progress of the Thunderbolts' game scheduled for tomorrow. Once the game is completed, the data processing system can determine the outcome and compare it to the condition specified in the prompt. If the Thunderbolts win, the condition is considered satisfied.

In some implementations, the data processing system can determine that the condition is satisfied upon a change in the status of the future event. The data processing system can continuously monitor the event through real-time or near real-time data feeds, scheduled checks, or external APIs that provide updates on the event's progress. As the condition evaluator of the data processing system monitors status changes, such as score updates or time elapsed, the data processing system can determine whether these changes satisfy the specified condition. For example, if the condition is "If the Falcons take the lead in the second half of their next game, give me a wager on the Falcons," the data processing system can retrieve the relevant game data from a connected data source and can monitor the game in real-time or near real-time, for example, to identify the second half. The data processing system can retrieve game status updates, such as live score feeds, from data providers or event tracking services, and compare the current score to detect when the Falcons take the lead. Once the data processing system identifies that the Falcons have taken the lead during the specified time period, the data processing system can determine that the condition has been satisfied.

The data processing system can transmit a notification to a client device responsive to determining that the condition is not satisfied (STEP 410). For example, if the condition "If the Falcons take the lead in the second half of their next game" is not satisfied, the data processing system can transmit a notification to the client device indicating that the condition is not satisfied, and the wager opportunity may not be executed. The notification can include details about the condition that is not satisfied and the related outcome, which is the cancellation of the wager opportunity.

The data processing system can update a player profile responsive to determining that the condition is satisfied (STEP 412). For example, if the condition "If the Falcons take the lead in the second half of their next game" is satisfied, the data processing system can evaluate the condition based on available data and update the profile profile. In some implementations, the data processing system can update the wager history associated with the player profile and adjust the available credit balance with respect to the wager associated with the wager opportunity specified in the condition. In some implementations, the data processing system can modify other profile details, such as the player's winning streak or average bet size. In this example, if the Falcons take the lead in the second half, the data processing system will update the player profile to record the wager's success, the amount won, and any other relevant profile data.

In some implementations, the data processing system can receive a request from the client device to remove an association between a wager opportunity and a condition in the player profile prior to determining if the condition is satisfied. For example, if John requests to cancel his bet on the Falcons winning their next game, the data processing system can update his player profile and remove the association between the wager and the condition, such that the condition is no longer associated with the wager opportunity.

The data processing system can provide an indication to a client device (STEP 414). For example, the data processing system can provide an indication to a client device when a specified condition is satisfied. The data processing system can generate an output message, using a language model, that identifies the wager opportunity and the satisfied condition. In some implementations, the data processing system can transmit a notification to the client device associated with the player profile via push notification or in-app message, informing the user of the satisfied condition and the related wager.

In some implementations, the data processing system can receive confirmation from the client device after a condition has been satisfied. In some implementations, the language model can generate a command for the data processing system to update the player profile. In some implementations, upon receiving the confirmation, such as when the user taps the "Confirm" button on their client device, the data processing system can update the player profile by recording the wager, adjusting the credit balance to indicate any winnings or losses, or modifying other profile data.

Figure 6:
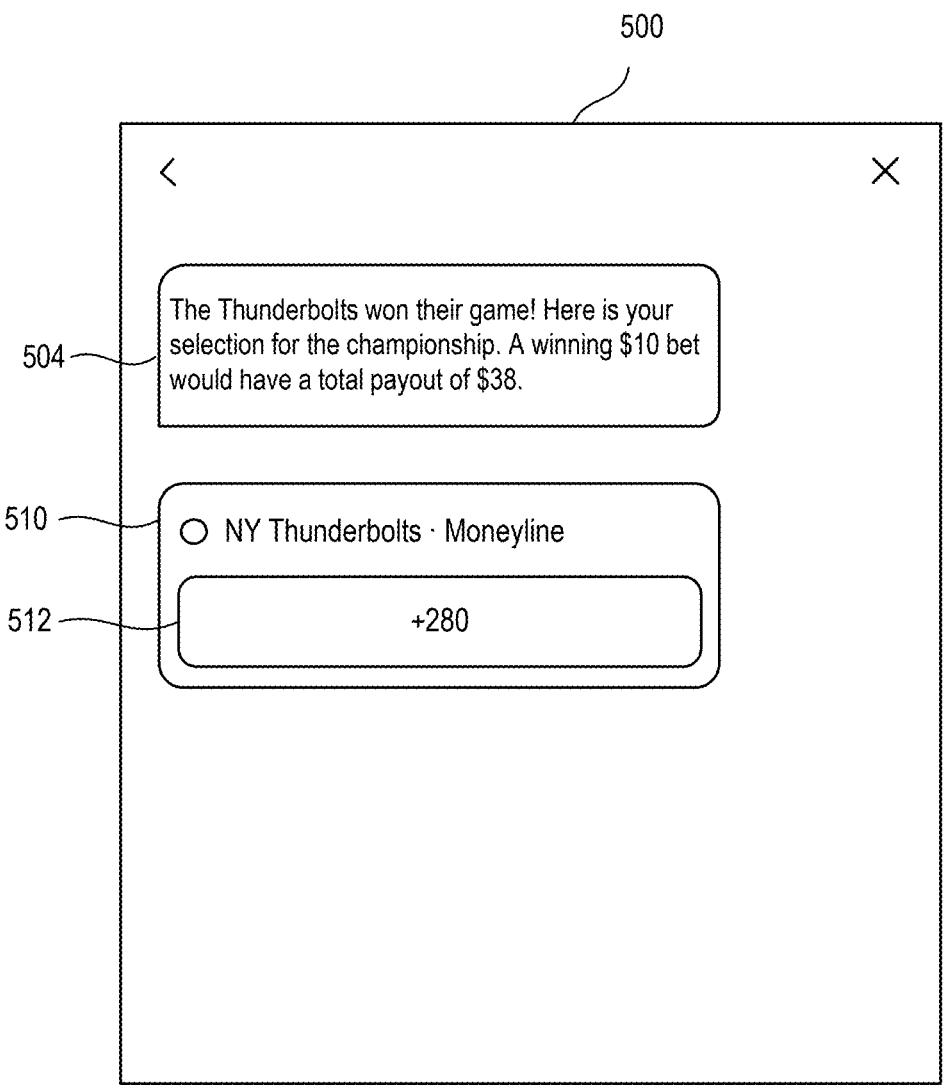

Referring now to FIGS. 5-6, depicted is an example implementation of an application interface, as described in connection with FIG. 4. As shown, a graphical user interface 500 can display a prompt 502 based on a player's interaction with a message bar 506. The prompt 502 can be an initial prompt or search term entered by the player via the message bar 506. The message bar 506 can be used to input text or initiate voice commands for sending prompts 502. For example, players can type their message directly into the designated text box within the message bar 506, or they can use a microphone icon 508 to dictate their prompts. In this example, the prompt 502 reads "If the Thunderbolts win their next game, give me a wager on them to win the championship", indicating a request for a wager opportunity contingent upon whether the Thunderbolts win their next game.

The data processing system 105 can receive text data entered into the prompt 502 as input from the client system 115 over the network 110. Upon receiving the prompt, the data processing system 105 can determine the classification of the intent behind the request based on keywords, such as "wager", "Thunderbolts", "next game", and "championship". The data processing system 105 can generate an input context for the language model 195 based on the classified prompt, which may include details such as the specific team (e.g., Thunderbolts) and the type of event (e.g., regular season game, playoff game) being queried, among others.

The language model 195 can process the input context, which can include the prompt, identified team, event type, and relevant conditions, to generate a data structure corresponding to an output message 504. The client system 115 can parse the data structure to display the output message 504 via the graphical user interface 500, such as "If the Thunderbolts win their next game, a wager opportunity for them to win the championship will be added to your bet slip. This request has been noted, and I'll notify you once their game is over so you can review and place the bet based on the latest odds and conditions".

The language model 195 can generate a command for the data processing system 105 based on the input context. The command generated by the language model 195 can cause the data processing system 105 to retrieve data from an external data source, such as a live event feed, and determine whether Thunderbolts won their next game. In some implementations, the data processing system 105 can continuously monitor the progress of the live event, including metrics such as the score, time remaining, and other relevant data points. Once the game is complete, the data processing system 105 can compare the final outcome to the specified condition, such as whether the Thunderbolts won the game. If the final outcome confirms that the Thunderbolts did win, the data processing system 105 can determine that the condition has been satisfied.

Upon determining that Thunderbolts have won, the data processing system 105 can update the input context for the language model 195 to indicate that the condition has been satisfied and provide relevant wager opportunities associated with the event. The language model 195 can process the input context (which can include the prompt, identified wager opportunity data, and other relevant data) to generate a data structure corresponding to one or more wager opportunities associated with the event. For example, the data structure can include information such as the notification, wager type, participants, and relevant metrics, among other details.

As shown in connection with FIG. 6, the client system 115 can parse the data structure to display the output message 504 via the graphical user interface 500, such as "The Thunderbolts won their game! Here is your selection for the championship. A winning $10 bet would have a total payout of $38". The graphical user interface 500 can also display the wager option 510 and odds 512 associated with the generated wager option 510. The odds 512 can indicate betting dynamics. For example, positive odds, such as +280, indicate that a $10 wager at +280 odds will result in a total payout of $38, including a $28 profit.

Figure 7:
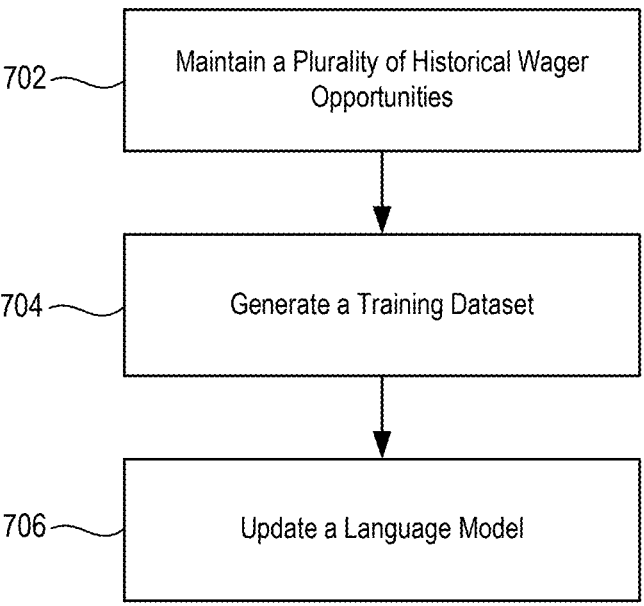
FIG. 7 illustrates an example flow diagram of a method for training language models to generate instructions for network optimization, in accordance with one or more implementations.

D. Systems and Methods for Training Language Models to Generate Instructions for Network Optimization Referring now to FIG. 7, depicted is an illustrative flow diagram of a method 700 for training language models to generate instructions for network optimization. The method 700 can be executed, performed, or otherwise carried out by a server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 700, the server or the system can maintain a plurality of historical wager opportunities (STEP 702), generate a training dataset (STEP 704), and update a language model (STEP 706).

In further detail of method 700, the data processing system can maintain a plurality of historical wager opportunities (STEP 702). The historical wager opportunities can correspond to past wagering opportunities. For example, the historical wager opportunities can include details about the wagers placed on past games, such as the types of wagers, the odds offered, the outcomes of those wagers, and the volume of wagers made on specific events or outcomes. In some implementations, the historical wager opportunities can include event information, identifying the specific event each wager is tied to, such as team names, game details, etc. The historical wager opportunities can include wager options, including different types of bets available for each event, such as moneyline, point spread, or over/under, among other markets. The historical wager opportunities can include odds, for example, the payout ratio associated with each wager and how much a winning wager returned.

The data processing system can generate a training dataset (STEP 704). For example, the data processing system, via the model updater, can generate the training dataset using the data corresponding to historical wagers. The training dataset can include a plurality of training examples, where each training example includes a respective input prompt and a respective output message. The respective input prompt can include a request indicating a conditional intent relating to wager opportunities. The conditional intent can specify a condition to be evaluated for the request, such that the condition is to be satisfied for the wager to be placed. The respective output message can identify one or more commands for the data processing system to evaluate the condition. The commands can be derived based on the conditional intent and the request. In some implementations, the condition can correspond to the occurrence of an event within a specific time period (e.g., determining whether a team or a player is playing tonight's game). In some implementations, the condition can correspond to a future event. For example, one training example can include an input prompt such as, "If the Thunderbolts score more than 100 points in their third game, give me a wager on the Thunderbolts for the playoffs". In this case, the conditional intent is the Thunderbolts scoring more than 100 points in their third game. The respective output message generated can include commands for the data processing system to monitor the third game and determine the Thunderbolts' score. The model updater of the data processing system can use the training dataset to train the language model how to process various conditional intents, evaluate conditions specified in the prompt, and generate appropriate output messages for the data processing system to evaluate those conditions.

In some implementations, the condition for each training example can identify the occurrence of a specific event. For example, the input prompt can include a condition such as "If the Thunderbolts win their third game". The language model can be trained to identify and process such conditions corresponding to wagering opportunities. In some implementations, the request within a training example can specify a future condition to be monitored, such as "Monitor the Thunderbolts' next game to determine if they win before placing a wager on their playoff chances".

In some implementations, the input prompt for a training example can include multiple conditions that are to be satisfied. For example, the prompt can state, "If the Thunderbolts score more than 30 points in the first quarter and win tonight's game, give me a wager on the Thunderbolts for their next game". In this example, the language model can learn how to process multiple conditions specified in the prompt and generate a command that causes the data processing system to monitor various conditions associated with a wager opportunity before identifying a relevant wager opportunity. In some implementations, the input prompt can include data corresponding to a live event retrieved from one or more data sources. For example, if the prompt specifies "If the Thunderbolts are leading by 10 points with 5 minutes left", the language model can be trained to generate a command to cause the data processing system to retrieve real-time or near real-time event data from external sources to monitor live scores and game status.

In some implementations, the data processing system can classify the condition in a training example and select the one or more commands for the training example based on the classification of the condition. The model updater of the data processing system can use the classification to train the language model to identify the type of condition specified in a prompt, such as whether the condition relates to an event outcome, a specific time period, or a combination of factors. In some implementations, to train the language model, the data processing system can select the relevant commands and pair them with the respective input prompts. For example, if the condition in a training example is "If the Thunderbolts are playing tonight's game", the data processing system can classify the condition as a scheduled event within a specific time frame. Based on the classification, the data processing system can select and pair commands such as "Determine if the Thunderbolts are scheduled to play tonight" and "If they are playing, provide relevant wager opportunities" with the input prompt, allowing the language model to learn which commands to generate when processing similar prompts.

In some implementations, the model updater of the data processing system can pair a specific command with an input prompt to train the language model on how to cause the data processing system to determine whether the occurrence of an event has been satisfied. For example, if the input prompt is "If the Thunderbolts score more than 100 points in their next game", the data processing system can select a command such as "Monitor the Thunderbolts' score during their next game" and pair the command with the input prompt. In this example, the language model can be trained to instruct the data processing system to monitor the future event and determine whether the specified event (e.g., Thunderbolts scoring more than 100 points) has been satisfied.

In some implementations, when multiple conditions are specified in the prompt, the model updater of the data processing system can generate several commands to be included in the output message of the training example. Each command can correspond to a specific condition in the input prompt, such that each condition is properly evaluated by the data processing system. For example, if the input prompt states, "If the Thunderbolts score more than 100 points in their next game and win the game," the data processing system can generate two commands for the output message. One command can be "Monitor the Thunderbolts' score during their next game", and another command can be "Determine whether the Thunderbolts win the game". Each command can be identified by a command token in the output message to distinguish between them. The command tokens can function as markers, allowing the data processing system to execute each command in the correct sequence or order.

In some implementations, the model updater of the data processing system can generate commands to be included in the training examples that cause the data processing system to monitor conditions and execute actions when those conditions are satisfied. In some implementations, the data processing system can pair a command with an input prompt to cause the data processing system to monitor conditions at regular intervals. For example, the command can cause the data processing system to determine if a certain team's score exceeds a certain threshold every five minutes, for instance, during the game. In some implementations, the output message of the training example can include a command that initiates an action once the future condition is satisfied. For example, if the condition is "If the Thunderbolts win tonight's game, give me a wager on their next opponent for the next game," the respective output message can include a command to initiate that action once the condition is satisfied. In some implementations, the corresponding action can include updating the player profile with a wager opportunity. For example, once the data processing system determines that the Thunderbolts won their game, the data processing system can update the player profile to indicate that the relevant wager opportunity on their next opponent has been added, such that the player is informed and ready to place the bet.

The data processing system can update a language model (STEP 706). For example, as described herein, the data processing system can train the language model using the training examples included in the training dataset. Each training example, which includes a respective input prompt and a corresponding output message, can allow the language model to learn how to process various conditions specified in user prompts and generate accurate commands. For example, the data processing system can expose the language model to different types of conditional intents, such as wager opportunities associated with live events. By iteratively processing these examples, the language model can be trained to identify patterns, classify conditions, and generate commands that cause the data processing system to perform specific actions.

E. Computing and Network Environment

Figure 8:
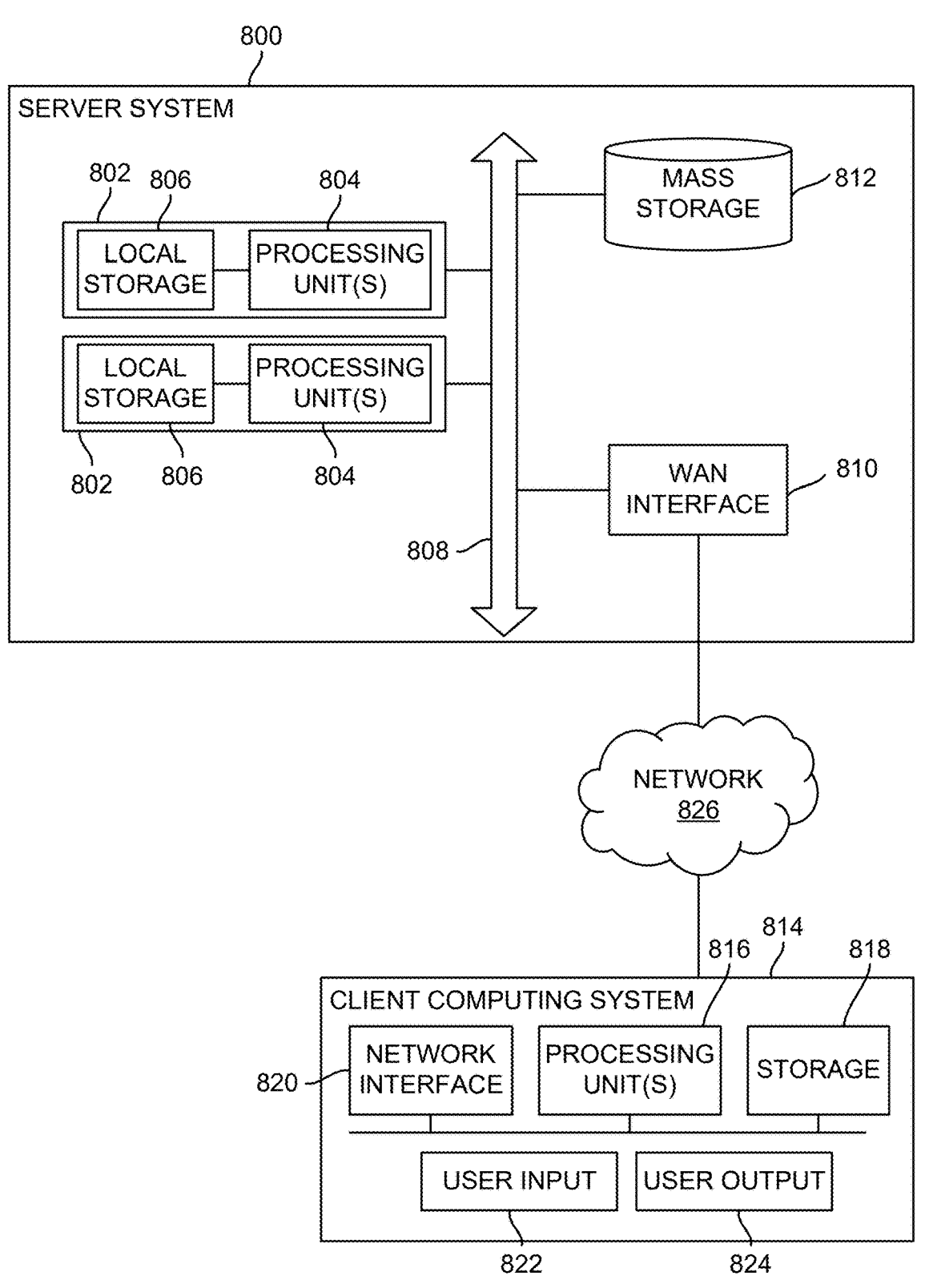
FIG. 8 illustrates a block diagram of a server system and a client computer system in accordance with an illustrative implementation.

Various operations described herein can be implemented on computer systems. FIG. 8 shows a simplified block diagram of a representative server system 800, client computer system 814, and network 826 usable to implement certain implementations of the present disclosure. In various implementations, server system 800 or similar systems can implement services or servers described herein or portions thereof. Client computer system 814 or similar systems can implement clients described herein. The system (e.g., the data processing system 105) and others described herein can be similar to the server system 800.

Server system 800 can have a modular design that incorporates a number of modules 802; while two modules 802 are shown, any number can be provided. Each module 802 can include processing unit(s) 804 and local storage 806.

Processing unit(s) 804 can include a single processor, which can have one or more cores, or multiple processors.

In some implementations, processing unit(s) 804 can include a general-purpose primary processor as well as one or more special-purpose co-processors such as graphics processors, digital signal processors, or the like. In some implementations, some or all processing units 804 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 804 can execute instructions stored in local storage 806. Any type of processors in any combination can be included in processing unit(s) 804.

Local storage 806 can include volatile storage media (e.g., DRAM, SRAM, SDRAM, or the like) and/or non-volatile storage media (e.g., magnetic or optical disk, flash memory, or the like). Storage media incorporated in local storage 806 can be fixed, removable or upgradeable as desired. Local storage 806 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 804 need at runtime. The ROM can store static data and instructions that are needed by processing unit(s) 804. The permanent storage device can be a non-volatile read-and-write memory device that can store instructions and data even when module 802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 806 can store one or more software programs to be executed by processing unit(s) 804, such as an operating system and/or programs implementing various server functions such as functions of the data processing systems 105 of FIG. 1 or any other system described herein, or any other server(s) associated with the data processing systems 105, or any other system described herein.

"Software" refers generally to sequences of instructions that, when executed by processing unit(s) 804 cause server system 800 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 804. Software can be implemented as a single program or a collection of separate programs or program modules that interact as desired. From local storage 806 (or non-local storage described below), processing unit(s) 804 can retrieve program instructions to execute and data to process in order to execute various operations described above.

In some server systems 800, multiple modules 802 can be interconnected via a bus or other interconnect 808, forming a local area network that supports communication between modules 802 and other components of server system 800. Interconnect 808 can be implemented using various technologies including server racks, hubs, routers, etc.

A wide area network (WAN) interface 810 can provide data communication capability between the local area network (interconnect 808) and the network 826, such as the Internet. Technologies can be used, including wired (e.g., Ethernet, IEEE 802.3 standards) and/or wireless technologies (e.g., Wi-Fi, IEEE 802.8 standards).

In some implementations, local storage 806 is intended to provide working memory for processing unit(s) 804, providing fast access to programs and/or data to be processed while reducing traffic on interconnect 808. Storage for larger quantities of data can be provided on the local area network by one or more mass storage subsystems 812 that can be connected to interconnect 808. Mass storage subsystem 812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 812. In some implementations, additional data storage resources may be accessible via WAN interface 810 (potentially with increased latency).

Server system 800 can operate in response to requests received via WAN interface 810. For example, one of modules 802 can implement a supervisory function and assign discrete tasks to other modules 802 in response to received requests. Work allocation techniques can be used. As requests are processed, results can be returned to the requester via WAN interface 810. Such operation can generally be automated. Further, in some implementations, WAN interface 810 can connect multiple server systems 800 to each other, providing scalable systems capable of managing high volumes of activity. Techniques for managing server systems and server farms (collections of server systems that cooperate) can be used, including dynamic resource allocation and reallocation.

Server system 800 can interact with various user-owned or user-operated devices via a wide-area network such as the Internet. An example of a user-operated device is shown in FIG. 8 as client computing system 814. Client computing system 814 can be implemented, for example, as a consumer device such as a smartphone, other mobile phone, tablet computer, wearable computing device (e.g., smart watch, eyeglasses), desktop computer, laptop computer, and so on.

For example, client computing system 814 can communicate via WAN interface 810. Client computing system 814 can include computer components such as processing unit(s) 816, storage device 818, network interface 820, user input device 822, and user output device 424. Client computing system 814 can be a computing device implemented in a variety of form factors, such as a desktop computer, laptop computer, tablet computer, smartphone, other mobile computing device, wearable computing device, or the like.

Processor 816 and storage device 818 can be similar to processing unit(s) 804 and local storage 806 described above. Suitable devices can be selected based on the demands to be placed on client computing system 814; for example, client computing system 814 can be implemented as a "thin" client with limited processing capability or as a high-powered computing device. Client computing system 814 can be provisioned with program code executable by processing unit(s) 816 to enable various interactions with server system 800 of a message management service such as accessing messages, performing actions on messages, and other interactions described above. Some client computing systems 814 can also interact with a messaging service independently of the message management service.

Network interface 820 can provide a connection to the network 826, such as a wide area network (e.g., the Internet) to which WAN interface 810 of server system 800 is also connected. In various implementations, network interface 820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 822 can include any device (or devices) via which a user can provide signals to client computing system 814; client computing system 814 can interpret the signals as indicative of particular user requests or information. In various implementations, user input device 822 can include any or all of a keyboard, touch pad, touch screen, mouse or other pointing device, scroll wheel, click wheel, dial, button, switch, keypad, microphone, and so on.

User output device 824 can include any device via which client computing system 814 can provide information to a user. For example, user output device 824 can include a display to display images generated by or delivered to client computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 804 and 816 can provide various functionality for server system 800 and client computing system 814, including any of the functionality described herein as being performed by a server or client, or other functionality associated with message management services.

It will be appreciated that server system 800 and client computing system 814 are illustrative and that variations and modifications are possible. Computer systems used in connection with implementations of the present disclosure can have other capabilities not specifically described here. Further, while server system 800 and client computing system 814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the system described herein can include clients and servers. For example, the system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing a system, the systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
   one or more processors coupled to non-transitory memory, the one or more processors configured to:
   monitor a status of a plurality of live events;
   maintain a plurality of wager opportunities corresponding to the plurality of live events;
   receive, from a client device associated with a player profile, a prompt comprising a wager condition and a request for a wager recommendation, the wager condition corresponding to at least one future event;
   generate, using a language model and the prompt, output comprising (i) a command to monitor the wager condition indicated in the prompt, and (ii) a wager opportunity of the plurality of wager opportunities selected based on the prompt;
   determine, using the command and the status of the plurality of live events, that the wager condition corresponding to the at least one future event has been satisfied;
   responsive to determining that the wager condition is satisfied, update the player profile to include a wager generated according to the wager opportunity associated with the wager condition; and
   provide an indication of the wager condition was satisfied to the client device.

2. The system of claim 1, wherein the wager condition indicates an outcome for the at least one future event, and wherein the one or more processors are further configured to:
   determine that the outcome occurred for the at least one future event to determine that the wager condition is satisfied.

3. The system of claim 1, wherein the one or more processors are further configured to:
   select the wager opportunity from a database storing information of the plurality of wager opportunities based on at least one keyword in the prompt.

4. The system of claim 1, wherein the one or more processors are further configured to:
   generate, using the language model, an output message identifying the wager opportunity and the wager condition;
   receive, from the client device, a second request corresponding to the wager opportunity and the wager condition; and
   update the player profile to indicate the wager condition in response to the second request.

5. The system of claim 4, wherein the one or more processors are further configured to:
   receive the second request as part of a second prompt; and
   generate, using the language model and the second prompt, a second command to update the player profile.

6. The system of claim 1, wherein the one or more processors are further configured to:
   monitor a status of the at least one future event; and
   determine that the wager condition is satisfied upon a change in the status of the at least one future event.

7. The system of claim 6, wherein the one or more processors are further configured to:
   receive, from at least one external computing system, a message identifying the change in the status of the at least one future event.

8. The system of claim 1, wherein the player profile identifies a second wager opportunity corresponding to a second wager condition generated based on a second prompt, the second wager condition corresponding to a second future event.

9. The system of claim 8, wherein the one or more processors are further configured to:
   receive, prior to determining that the wager condition is satisfied, a second request to remove an association between the second wager opportunity and the wager condition in the player profile; and update the player profile to remove the association between the second wager opportunity and the wager condition in the player profile.

10. The system of claim 8, wherein the one or more processors are further configured to:

determine that the second wager condition corresponding to the second future event cannot be satisfied; and transmit a notification to the client device indicating that the second wager condition cannot be satisfied.

11. A method, comprising:

maintaining, by one or more processors coupled to non-transitory memory, a plurality of wager opportunities corresponding to a plurality of live events;

receiving, by the one or more processors, from a client device associated with a player profile, a prompt comprising a wager condition and a request for a wager recommendation, the wager condition corresponding to at least one future event;

generating, by the one or more processors, using a language model and the prompt, output comprising (i) a command to monitor the wager condition indicated in the prompt, and (ii) a wager opportunity of the plurality of wager opportunities selected based on the prompt;

determining, by the one or more processors, using the command, that the wager condition corresponding to the at least one future event has been satisfied;

responsive to determining that the wager condition is satisfied, updating, by the one or more processors, the player profile to include a wager generated according to the wager opportunity associated with the wager condition; and providing, by the one or more processors, an indication of the wager condition was satisfied to the client device.

12. The method of claim 11, wherein the wager condition indicates an outcome for the at least one future event, further comprising:

determining, by the one or more processors, that the outcome occurred for the at least one future event to determine that the wager condition is satisfied.

13. The method of claim 11, further comprising:

selecting, by the one or more processors, the wager opportunity from a database storing information of the plurality of wager opportunities based on at least one keyword in the prompt.

14. The method of claim 11, further comprising:

generating, by the one or more processors, using the language model, an output message identifying the wager opportunity and the wager condition;

receiving, by the one or more processors, from the client device, a second request corresponding to the wager opportunity and the wager condition; and updating, by the one or more processors, the player profile to indicate the wager condition in response to the second request.

15. The method of claim 14, further comprising:

receiving, by the one or more processors, the second request as part of a second prompt; and generating, by the one or more processors, using the language model and the second prompt, a second command to update the player profile.

16. The method of claim 11, further comprising:

monitoring, by the one or more processors, a status of the at least one future event; and determining, by the one or more processors, that the wager condition is satisfied upon a change in the status of the at least one future event.

17. The method of claim 16, further comprising:

receiving, by the one or more processors, from at least one external computing system, a message identifying the change in the status of the at least one future event.

18. The method of claim 11, wherein the player profile identifies a second wager opportunity corresponding to a second wager condition generated based on a second prompt, the second wager condition corresponding to a second future event.

19. The method of claim 18, further comprising:

receiving, by the one or more processors, prior to determining that the wager condition is satisfied, a second request to remove an association between the second wager opportunity and the wager condition in the player profile; and updating, by the one or more processors, the player profile to remove the association between the second wager opportunity and the wager condition in the player profile.

20. The method of claim 18, further comprising:

determining, by the one or more processors, that the second wager condition corresponding to the second future event cannot be satisfied; and transmitting, by the one or more processors, a notification to the client device indicating that the second wager condition cannot be satisfied.

21. A system, comprising:

one or more processors coupled to non-transitory memory, the one or more processors configured to:

maintain a plurality of wager opportunities corresponding to a plurality of live events;

receive, from a client device associated with a player profile, a prompt comprising a wager condition and a request for a wager recommendation, the wager condition corresponding to at least one future event;

generate, using a language model and the prompt, output comprising (i) a command to monitor the wager condition indicated in the prompt, and (ii) a wager opportunity of the plurality of wager opportunities selected based on the prompt;

determine, using the command, that the wager condition corresponding to (i) a real time or near real time status, (ii) result, or (iii) occurrence of the at least one future event has been satisfied;

responsive to determining that the wager condition is satisfied, update the player profile to include a wager generated according to the wager opportunity associated with the wager condition; and provide an indication of the wager condition was satisfied to the client device.

22. A method, comprising:

maintaining a plurality of wager opportunities corresponding to a plurality of live events;

receiving, from a client device associated with a player profile, a prompt comprising a wager condition and a request for a wager recommendation, the wager condition corresponding to at least one future event;

generating, using a language model and the prompt, output comprising (i) a command to monitor the wager condition indicated in the prompt, and (ii) a wager opportunity of the plurality of wager opportunities selected based on the prompt;

determining, using the command, that the wager condition corresponding to (i) a real time or near real time status, (ii) result, or (iii) occurrence of the at least one future event has been satisfied;

responsive to determining that the wager condition is satisfied, update the player profile to include a wager generated according to the wager opportunity associated with the wager condition; and providing an indication of the wager condition was satisfied to the client device.

23. A system, comprising:

one or more processors coupled to non-transitory memory, the one or more processors configured to:

monitor a status of a plurality of live events;

maintain a plurality of wager opportunities corresponding to the plurality of live events;

receive, from a client device associated with a player profile, a prompt comprising a wager condition and a request for a wager recommendation, the wager condition corresponding to at least one future event;

generate, using a language model and the prompt, output comprising (i) a command to monitor the wager condition indicated in the prompt, and (ii) a wager opportunity of the plurality of wager opportunities selected based on the prompt;

update, based on an update to the plurality of live events, the plurality of wager opportunities to include a new wager opportunity corresponding to the wager condition;

determine, using the command and the status of the plurality of live events, that the wager condition corresponding to the at least one future event has been satisfied;

responsive to determining that the wager condition is satisfied, update the player profile to include a wager generated according to the wager opportunity associated with the wager condition; and provide an indication of the wager condition was satisfied to the client device.

24. The system of claim 23, wherein the one or more processors are further configured to:

update the plurality of wager opportunities to include a new wager opportunity corresponding to the wager condition is based on an update to the plurality of wager opportunities.

25. A method, comprising:

monitoring a status of a plurality of live events;

maintaining a plurality of wager opportunities corresponding to the plurality of live events;

receiving, from a client device associated with a player profile, a prompt comprising a wager condition and a request for a wager recommendation, the wager condition corresponding to at least one future event;

generating, using a language model and the prompt, output comprising (i) a command to monitor the wager condition indicated in the prompt, and (ii) a wager opportunity of the plurality of wager opportunities selected based on the prompt;

determining, using the command and the status of the plurality of live events, that the wager condition corresponding to the at least one future event has been satisfied;

responsive to determining that the wager condition is satisfied, update the player profile to include a wager generated according to the wager opportunity associated with the wager condition; and providing an indication of the wager condition was satisfied to the client device.

26. The method of claim 25, further comprising:

updating the plurality of wager opportunities to include a new wager opportunity corresponding to the wager condition is based on an update to the plurality of wager opportunities.

\* \* \* \* \*